United States Patent
Schroder et al.

(10) Patent No.: US 6,509,086 B1
(45) Date of Patent: Jan. 21, 2003

(54) BACKED SANITARYWARE AND PROCESS FOR THE PRODUCTION THEREOF

(75) Inventors: Axel Schroder, Hanau (DE); Ralf Debes, Krombach-Oberschur (DE)

(73) Assignee: Roehm GmbH & Co KG, Darmstadt (DE)

( * ) Notice: Subject to any disclaimer, the term of this patent is extended or adjusted under 35 U.S.C. 154(b) by 0 days.

(21) Appl. No.: 09/487,045

(22) Filed: Jan. 19, 2000

(30) Foreign Application Priority Data

Jan. 23, 1999 (DE) .......................................... 199 02 683

(51) Int. Cl.[7] .............................. B32B 7/02; A61F 13/15
(52) U.S. Cl. ........................ 428/212; 604/387; 604/389
(58) Field of Search ........................... 428/212; 604/387, 604/389

(56) References Cited

U.S. PATENT DOCUMENTS

| | | | | |
|---|---|---|---|---|
| 4,252,910 A | * | 2/1981 | Schaefer ..................... | 521/145 |
| 5,514,122 A | * | 5/1996 | Morris et al. ............... | 604/387 |
| 5,684,083 A | * | 11/1997 | Temple et al. .............. | 524/541 |

* cited by examiner

Primary Examiner—Cynthia H. Kelly
Assistant Examiner—L. Ferguson
(74) Attorney, Agent, or Firm—Oblon, Spivak, McClelland, Maier & Neustadt, P.C.

(57) ABSTRACT

Backed sanitaryware, such as baths, shower trays, wash basins and the like comprise an acrylic polymer moulding, the reverse of which is reinforced with a polymer material containing neither glass fibre nor asbestos, which material is firmly bonded to the acrylic polymer moulding, wherein the reinforcement is obtainable by curing a polymerisable, cold-curing reactive (meth)acrylate system sprayed onto the reverse of the acrylic polymer moulding, which system contains, in addition to further constituents, A) as polymerisable monomers:

| A) | a) | (meth)acrylate | 30–100 wt. % |
|---|---|---|---|
| | a1) | methyl (meth)acrylate | 0–99.8 wt. % |
| | a2) | $C_2$—$C_4$(meth)acrylate | 0–99.8 wt. % |
| | a3) | $\geq C_5$ (meth)acrylate | 0–50 wt. % |
| | a4) | polyfunctional (meth)acrylates | 0–50 wt. % |
| | a5) | urethane (meth)acrylates | 0.2–50 wt. % |
| | b) | comonomers | 0–70 wt. % |
| | b1) | vinyl aromatics | 0–35 wt. % |
| | b2) | vinyl esters | 0–35 wt. % | wherein components a1) to b2) are selected such that they amount to 100 wt. %.

The further constituents of the (meth)acrylate system are disclosed in the description. The sanitaryware according to the invention meets all requirements of DIN EN 198 and further relevant standards and is completely and straightforwardly recyclable.

57 Claims, No Drawings

BACKED SANITARYWARE AND PROCESS FOR THE PRODUCTION THEREOF

DESCRIPTION

This process relates to backed sanitaryware and to a process for the production of such sanitaryware.

In particular, the invention relates to baths or shower trays and basins which preferably comprise a thermoformed acrylic polymer moulding, the reverse of which is reinforced with a polymer material containing neither glass fibre nor asbestos and preferably of a thickness of 1.5 to 10 mm, which material is firmly bonded to the acrylic polymer moulding, in particular without additional coupling agents, wherein this reinforcement is obtainable by polymerising a (meth)acrylate system.

The following publications are cited as close prior art:

D1=EP-A-0 693 503;

D2=WO 98/45375=PCT/EP98/01881; and

D3=DE 197 14 399 A1.

Reinforced sanitaryware which comprises a thermoformed acrylic polymer moulding, the reverse of which is reinforced with a layer of a polymer material containing fibres, which material is firmly bonded to the acrylic polymer molding without additional coupling agents, is known from EP-A-0 693 503 (=D1).

Such backed sanitaryware is characterised in that the reinforcing layer is 1 to 5 mm thick and is obtainable by curing a polymerisable, cold-curing, reactive (meth)acrylate system sprayed onto the reverse of the acrylic polymer moulding. Essential constituents of the (meth)acrylate system in this case comprise, in addition to the polymerisable constituents, a redox system, finely divided fillers and 10–50 wt. % of chopped glass fibre for reinforcement.

D1 also discloses a process for the production of backed sanitaryware, in which a reactive resin system is sprayed onto the reverse of an acrylic polymer moulding, wherein the resin system cures in contact with the acrylic polymer moulding, so bonding to the acrylic polymer moulding, wherein a resin system predominantly based on (meth)acrylates is used, which cures to form a polymer having a glass transition temperature Tg of >70° C. and, relative to 1 part by weight of the resin system, may comprise up to 2.33 parts by weight of such fillers which are inert under the depolymerisation conditions of the acrylic polymer moulding. The wording of the process claim according to D1 indicates that the presence of chopped glass fibre is not absolutely essential. However, chopped glass fibre is used as a reinforcing material in all the Examples.

One advantage of the known backed sanitaryware should apparently be that it should be straightforwardly possible to reprocess it by depolymerisation (providing that appropriate finely divided fillers have been selected). While this is indeed entirely true with regard to the finely divided fillers disclosed in D1, the chopped glass fibre required in large quantities for reinforcement do present problems during depolymerisation, as has unfortunately been confirmed by extensive practical experience. While it is indeed theoretically possible to assume that the chopped fibre from the used parts will collect on the surface of the metal bath required for depolymerisation and it will be possible to skim them off with a vane or blade, it has been found that a non-negligible quantity of chopped fibre remains in the metal bath and cannot straightforwardly be removed. Moreover, in principle, similar occupational hygiene concerns apply to chopped glass fibre as apply to asbestos fibres. It is not straightforwardly possible to avoid exposing operating personnel to the health hazard posed by chopped glass fibre, some of which is in fine particulate form, during depolymerisation. Dispensing with such fibrous fillers is thus, in itself, highly desirable.

Furthermore, at least some of the methacrylate systems on which prior art reinforcing layers are based have a tendency towards curing problems, such as entrapped air etc.. The chopped glass fibre used for reinforcement stands out, i.e. once sprayed on, the fibres, which are some centimetres in length, do not lie flat on the reverse of the moulding, but instead, due to tangling within the reinforcing material, protrude to a greater or lesser extent from the plane of the moulding. Rolling is accordingly essential in order to prevent curing problems and to press the fibre reinforcement into the surface. This manual secondary finishing (i.e. performed by hand) is elaborate and increases the cost of the product.

Solutions containing no chopped glass fibre are known from D2. Backed sanitaryware is disclosed which comprises an acrylic polymer moulding, the reverse of which is reinforced with a polymer material containing neither glass fibre nor asbestos and of a thickness of 1.5 to 10 mm, which material is firmly bonded to the acrylic polymer moulding without additional coupling agents, wherein the reinforcing material or reinforcement is obtainable by curing a polymerisable, cold-curing reactive (meth)acrylate system sprayed onto the reverse of the acrylic polymer moulding, which system is characterised in that it comprises, as an essential filler, hollow microparticles filled with inert gas in a quantity of 0.1 to 50 wt. %, relative to the entire weight of the (meth)acrylate system. Using gas-filled, expanded hollow plastics microspheres preferably coated with calcium carbonate as a filler in the (meth)acrylate system results in an improvement of the mechanical properties of the backing layer, in particular with regard to impact strength, tensile bond strength and flexural strength, and with regard to testing to DIN EN 198 (alternating hot water test and falling ball test).

D2 furthermore discloses sanitaryware having two-layer backing layers. Preferably, a first backing layer provides the necessary impact strength while a second (outer) backing layer imparts the rigidity required for practical service to the sanitaryware. The (meth)acrylate system which provides the first layer preferably has a relatively high content of relatively long-chain (meth)acrylates, which have ester residues having five or more carbon atoms, while the content of such monomers in the (meth)acrylate system of the second layer is 0 to less than 10 wt. %. The (pre)polymers which are essentially present in the particular resin system may also differ. The (pre)polymer of the first reinforcing layer may accordingly have a comonomer content of between 30 and 80 wt. %, while the comonomer content in the (pre)polymer of the second backing layer is preferably between 0 and <30 wt. %.

Although the sanitaryware according to D2 performs excellently in practice, the industrial production of two backing layers is complex. Processors must accordingly hold stocks of and process two resin systems. There is a drying step between the two application steps.

It should be noted with regard to the hollow microsphere fillers that, due to the elevated compressibility thereof, they are not readily sprayed using conventional spraying equipment. This entails the development of new spray processing equipment.

Moreover, the mechanical properties of the sanitaryware backed using hollow microspheres merit further improvement.

Single-layer solutions are moreover known from D3, in which a thermoformed acrylic polymer moulding, the reverse of which is reinforced with polymer material containing neither glass fibre nor asbestos, which material is firmly bonded to the acrylic polymer moulding without additional coupling agents, is distinguished in that the reinforcing material is 1.5 to 10 mm thick and is obtainable by curing a polymerisable, cold-curing, reactive (meth)acrylate system sprayed onto the reverse of the acrylic polymer moulding, which system contains

| A) | (meth)acrylate | 30–100 wt. % |
|---|---|---|
| | methyl (meth)acrylate | 0–100 wt. % |
| | $C_2$–$C_4$ (meth)acrylate | 0–100 wt. % |
| | $\geq C_5$ (meth)acrylate | 0–50 wt. % |
| | polyfunctional (meth)acrylates | 0–50 wt. % |
| | comonomers | 0–50 wt. % |
| | vinyl aromatics | 0–30 wt. % |
| | vinyl esters | 0–30 wt. % |

B) per 1 part by weight of A), 0.05–5 parts by weight of a (pre)polymer soluble or swellable in A)

C) a redox system containing an accelerator and a peroxide catalyst or initiator in a quantity sufficient for cold-curing component A), which system is to be kept entirely or partially segregated until the constituents of the system to be polymerised are polymerised D) conventional additives E) fillers inert under depolymerisation conditions, relative to the sum of A)–E) having a fineness <100 μm 1 –75 wt. %.

In the light of the prior art cited and comprehensively discussed above, one object of the invention was to provide sanitaryware reinforced without chopped glass fibre and asbestos.

Another object of the invention was to provide completely recyclable sanitaryware based on acrylic polymer mouldings.

A further object of the invention is the provision of completely recyclable backed acrylic polymer mouldings which may in particular be recycled completely and as far as possible without endangering operating personnel, in particular using the depolymerisation process by means of metal baths which is known per se for acrylic polymer.

Another object of the invention is to provide backed sanitaryware which, while making the most economic use of material possible, meets the general requirements placed upon sanitaryware with regard to stability.

One further object of the invention was accordingly inter alia the provision of sanitaryware having adequate long-term adhesion of the reinforcing layer even and in particular without additional coupling agents.

The intention is also as far as possible to suppress cracking of the reinforcing layer.

One further object is to provide maximally impact-resistant coatings for acrylic polymer mouldings.

In particular, it is an object of the invention to provide acrylic polymer mouldings coated with the thinnest possible coatings and having the greatest possible impact resistance.

The novel sanitaryware should moreover be simple to manufacture.

Secondary finishing by hand should furthermore be reduced to a minimum.

The intention is to provide a process for the production of backed acrylic polymer mouldings which presents the fewest possible hazards.

Finally, it is also not immaterial that it should be possible as far and as simply as possible to automate the process for the production of backed acrylic polymer mouldings.

It is also of particular interest to produce backed sanitaryware which, if possible with only one backing layer, exhibits elevated and/or improved values with regard to one, two or more or all of the mechanical parameters, such as abrasion resistance, flexural strength (measured on the acrylic polymer side of the moulding), flexural strength (measured on the coating side), modulus of elasticity, impact strength (measured on the acrylic polymer side of the moulding), impact strength (measured on the coating side).

These objects and further objects, which, while not explicitly stated, may nevertheless straightforwardly be deduced from the introductory discussion of the prior art or be considered self-evident, may be achieved by backed sanitaryware having all the features of claim 1.

Advantageous developments of the sanitaryware according to the invention are the subject matter of the claims dependent upon the independent product claim.

In relation to processing, the features of the independent process claim state a solution to the problem underlying the invention with regard to processing aspects. Advantageous process variants are protected in the process claims dependent upon the independent process claim.

In particular because backed sanitaryware comprising an acrylic polymer moulding, the reverse of which is reinforced with a polymer material containing neither glass fibre nor asbestos and of a thickness of 1.5 to 10 mm, which material is firmly bonded to the acrylic polymer moulding without additional coupling agents, wherein the reinforcing material or reinforcement is obtainable by curing a polymerisable, cold-curing reactive (meth)acrylate system applied, preferably sprayed, onto the reverse of the acrylic polymer moulding, which system contains

| A) | a) | (meth)acrylate | 30–100 wt. % |
|---|---|---|---|
| | | a1) methyl (meth)acrylate | 0–99.8 wt. % |
| | | a2) $C_2$–$C_4$ (meth)acrylate | 0–99.8 wt. % |
| | | a3) $\geq C_5$ (meth)acrylate | 0–50 wt. % |
| | | a4) polyfunctional (meth)acrylates | 0–50 wt. % |
| | | a5) urethane (meth)acrylates | 0.2–50 wt. % |
| | b) | comonomers | 0–70 wt. % |
| | | b1) vinyl aromatics | 0–35 wt. % |
| | | b2) vinyl esters | 0–35 wt. % |

B) per 1 part by weight of A), 0.05–5 parts by weight of a (pre)polymer soluble or swellable in A)

C) a redox system containing an accelerator and a peroxide catalyst or initiator in a quantity sufficient for cold-curing component A), which system is to be kept entirely or partially segregated until the constituents of the system to be polymerised are polymerised D) conventional additives E) fillers relative to the sum of A)–E) 0–75 wt. %, it is possible outstandingly well to meet all the requirements set by standards institutes and industrial processors with regard to the physical properties of the sanitaryware and to achieve a large number of further additional advantages.

Such advantages include, inter alia:

Complete recyclability using the per se known depolymerisation route, inter alia by avoiding polyesters (absence of polyester resins) combined with the avoidance of particulates questionable on health grounds (absence of chopped glass fibre).

Omission of the "rolling step" during manufacture, so allowing further automation of the production process using spraying robots.

Excellent compliance with mechanical characteristics to DIN EN 198 (deformability, impact strength, rigidity), with performance exceeding requirements.

Excellent compliance with mechanical characteristics to DIN ISO 179 (impact strength), with performance exceeding requirements.

Excellent compliance with mechanical characteristics to DIN ISO 178 (flexural strength), with performance exceeding requirements.

Excellent compliance with mechanical characteristics to DIN ISO 4624 (tensile bond strength), with performance exceeding requirements.

Elevated strength of the mouldings on exposure to stress and excellent long-term adhesion of the bond between the backing layer and the acrylic polymer moulding.

The process of the invention is not an injection process, in which the filled resin composition is introduced into a gap between a thermoformed acrylic polymer moulding and a mould, but instead a spraying process requiring no mould. One decisive advantage of the spraying process in this connection is the fact that costly, appropriately shaped moulds are not required for different bath designs.

With the addition of 5% curing agent, the spraying system according to the invention cures completely after 15–25 minutes. This substantially shortens the duration of production.

The advantageous absence of solvents from the (meth)acrylate system minimises the risk of stress cracking. Especially in the alternating temperature test to DIN EN 198, systems containing solvents have a tendency to cause stress cracking in the finished reinforcing layer.

In comparison with EP-A-0 693 503, the invention not only has the substantial advantage with regard to complete recyclability of the absence of chopped glass fibre or also of glass fibre reinforcement in general, but is has also in particular been found that sanitaryware according to EP-A-0 693 503 still exhibits mechanical deficiencies which call the serviceability of the products according to EP-A-0 693 503 into question. By using specific fillers in the reinforcing layer, it is accordingly possible to bring about a major improvement precisely in the mechanical and physical properties of the sanitaryware according to the invention.

In comparison with sanitaryware from W098/45375, sanitaryware according to the invention may be obtained with a single backing layer; which sanitaryware, with regard not only to impact strength measured on the bath side and to flexural strength measured on the moulding side but also to flexural strength measured on the coating side, matches or surpasses the properties of the two-layer variants disclosed in W098/45375.

Backed sanitaryware of the invention comprises an acrylic polymer moulding and at least one reinforcing backing layer.

The Acrylic Polymer Mouldinqg

The shape and nature of the acrylic polymer moulding which is backed according to the invention are not subject to any particular limitations from the outset. It is possible to back acrylic polymer mouldings which have been produced using any process known to the person skilled in the art for shaping acrylic polymer. Such processes include, inter alia, processing in the viscous state, such as casting, pressing and coating processes, preferably rotational moulding, lamination moulding, compression moulding, transfer moulding, painting, dipping, coating, knife coating, lamination and the like; processing in the elastoviscous state, such as kneading, rolling, calendering, extrusion, injection moulding, preferably sandwich moulding, RIM process; processing in the elastoplastic state such as drawing, stretch forming, blow moulding, foaming, preferably cold forming methods such as stretch forming, stretching, draw forming, thermoforming, vacuum forming, pultrusion, extrusion blow moulding, injection blow moulding processes; processing in the viscoelastic state, such as welding, sintering, fluidised bed coating, flame spraying, hot jet spraying and the like; processing in the solid state, such as cutting, stamping, forging, sawing, drilling, turning or milling. Thermoforming is preferred in all its variants, including vacuum forming, mouldless vacuum forming, the vacuum female mould process, dropforming process, vacuum stretch forming process, suction thermoforming process and the like. Acrylic polymer mouldings obtainable by thermoforming are particularly preferred for the invention.

No limits apply with regard to the nature of the acrylic polymer either. Any conventional commercial grades of acrylic polymer may be used.

The acrylic polymer mouldings, which are provided according to the invention with a backing layer, contain, with regard to the acrylic polymer moulding, in addition to conventional additives, predominantly those structural units which comply with the following formula I with regard to the chemical structure thereof:

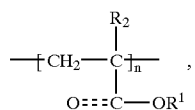

in which

R$_1$ is C$_{1-6}$ alkyl, preferably C$_{1-4}$ alkyl,

R$^2$ is H, C$_{1-6}$ alkyl, preferably H or C$_{1-4}$ alkyl, very particularly preferably H or CH$_3$, and n is a positive integer greater than 1.

C$_{1-4}$ alkyl includes linear and branched alkyl residues having one to four carbon atoms. Methyl, ethyl, n-propyl, isopropyl, n-butyl, 2-methyl-l-propyl, sec.-butyl, 2-methyl-2-propyl are of particular interest.

C$_{1-6}$ alkyl includes the residues stated for C$_{1-4}$ alkyl and additionally residues having 5 or 6 carbon atoms, such as preferably 1-pentyl, 2-pentyl, 3-pentyl, 2,2-dimethyl-l-propyl, 3-methyl-l-butyl, 3-methyl-2-butyl, 2-methyl-2-butyl, 2-methyl-l-butyl, 1-hexyl.

Examples of compounds which comprise the above-stated structural unit include, inter alia, polymethyl acrylate, polyethyl acrylate, polymethyl methacrylate, polypropyl acrylate, polybutyl acrylate, polypropyl methacrylate, polybutyl methacrylate and copolymers comprising two or more of these types of polymer. The first four compounds are preferred for the purposes of the invention. Polymethyl methacrylate (PMMA) is very particularly preferred.

In addition to the chemical mixtures (random copolymers or also block copolymers) obtained by copolymerising at least two substituted or unsubstituted acrylic acid ester monomers (for example methyl methacrylate/n-butyl methacrylate copolymers), it is also possible for the purposes of the invention to use acrylic polymer mouldings made from copolymers comprising up to 50 wt. % of at least one further vinylically unsaturated monomer which is copolymerisable with at least one substituted or unsubsituted acrylic acid ester monomer.

Examples of such copolymers are, inter alia, methyl methacrylate/styrene copolymers or methyl methacrylate/butyl acrylate/styrene terpolymers.

The comonomers are optional constituents or components, which are preferably present in the acrylic polymer in a subordinate quantity in the form of copolymers comprising them. They are generally selected such that they have no disadvantageous effect on the properties of the acrylic polymer to be used according to the invention.

The stated comonomer(s) may, inter alia, be used for the purpose of modifying the properties of the copolymer in a desired manner, for example by increasing or improving flow properties, if the copolymer is heated to melting temperature during processing to form the polymer material, or in order to reduce a residual colour in the copolymer or, by using a polyfunctional monomer, in order in this manner to introduce a certain degree of crosslinking into the copolymer.

Monomers suitable for this purpose include, inter alia, vinyl esters, vinyl chloride, vinylidene chloride, styrene, α-methylstyrene and the various halo-substituted styrenes, vinyl and isopropenyl ethers, dienes, such as for example 1,3-butadiene and divinylbenzene. A reduction in the colour of the copolymer may, for example, particularly preferably be achieved by using an electron-rich monomer, such as for example a vinyl ether, vinyl acetate, styrene or α-methylstyrene.

Of the stated comonomer compounds, those which are particularly preferred are aromatic vinyl monomers, such as for example styrene or α-methylstyrene.

Physical mixtures, known as blends, are also preferred for the acrylic polymer mouldings.

It should, inter alia, be borne in mind in this connection that the term "acrylic polymer material" is in fact fundamentally a collective term for organic synthetic polymer materials made from polymethacrylates, wherein the latter are produced by bulk or bead polymerisation (suspension polymerisation) and subsequent extrusion or injection moulding to form sheets, tubes, bars, blocks.

For the purposes of the invention, however, the above-stated variants should by definition also be included within the term "acrylic polymer material".

Synthetic polymer materials made from polymethacrylic acid methyl esters are, however, also particularly preferred for the invention.

The Backing Layer(s)

Since the reinforcing material is preferably of a relatively small thickness in the range from 1.5 to 10 mm, preferably of 1.5–<8 mm, it is possible to achieve considerable weight savings and material economies in the sanitaryware according to the invention, for example baths and basins, so reducing unit costs while still achieving the required strength values. These economies are further increased by the nature of the reinforcing layer, inter alia also with respect to monomer components and fillers, and by the manner in which the materials forming the reinforcing layer are applied. The rapid curing time generates additional economies.

A surprising improvement in significant properties of the reinforced sanitaryware according to the invention may be achieved in a non-obvious manner by the use of urethane (meth)acrylates (component a5)) in the backing layer or layers.

In particular, a considerable improvement in the mechanical properties of the cured material is achieved. It is surprising in this connection that not merely are properties such as impact strength or the tensile bond strength of the composite comprising the acrylic polymer moulding and backing improved, but the extent of the improvement is still more surprising. Improvements in tensile bond strength of 100% and more, relative to the reinforcing layers without urethane (meth)acrylates, may thus be observed.

Backed sanitaryware having favourable properties is, for example, obtained when the content of component a5) is in the range from 3 to 25 wt. %, preferably from 5 to 20 wt. %, relative to the sum of components a) and b) to 100 wt. %.

Although urethane (meth)acrylates which are already commercially available have made it possible to achieve certain advantages, the desired effects are particularly pronounced with the novel urethane (meth)acrylates according to the invention.

One extremely convenient variant of the invention provides that the (meth)acrylate system A) to E) used to the form the reinforcing layer of the sanitaryware contains a flexibilising content of at least one urethane (meth)acrylate a5) which comprises at least three reactive, terminal, ethylenically unsaturated functionalities.

These novel urethane (meth)acrylates are preferably obtainable by reacting either I)

i) hydroxyalkyl (meth)acrylic acid esters with ii) polyisocyanates and iii) polyoxyalkylenes having at least three hydroxyl functionalities, wherein the proportion of polyethylene oxide is less than 50 wt. %, relative to the total quantity of polyoxy-alkylene, or II)

i') hydroxyalkyl (meth)acrylic acid esters with ii') mixtures of polyisocyanates, at least one of which polyisocyanates has three or more isocyanate groups, and iii) polyoxyalkylenes having at least two hydroxyl functionalities, wherein the proportion of polyethylene oxide is less than 50 wt. %, relative to the total quantity of polyoxyalkylene.

Another convenient variant of the invention provides that the urethane (meth)acrylates a5) are obtainable by reacting hydroxyethyl methacrylate, hydroxyethyl acrylate, hydroxypropyl methacrylate, hydroxypropyl acrylate and/or mixtures of two or more of the above-stated compounds as the hydroxyalkyl (meth)acrylic acid esters.

Also of interest is sanitaryware which is characterised in that the urethane (meth)acrylates a5) are obtainable by reacting 2,4-toluene diisocyanate, 2,6-toluene diisocyanate, 4,4'-diphenylmethane diisocyanate (MDI), 4,4'-dicyclohexyl diisocyanate, meta- and para-tetramethylxylylene diisocyanate, 3-isocyanatomethyl-3,5,5-trimethylcyclohexyl isocyanate (isophorone diisocyanate), hexamethylene diisocyanate, 1,5-naphthylene diisocyanate, dianisidine diisocyanate, di-(2-isocyanatoethyl)bicyclo[2.2.1]hept-5-ene 2,3-dicarboxylate, 2,2,4- and 2,4,4-trimethylhexamethylene diisocyanate, triphenylmethane 4,4',4"-triisocyanate, tris-(4-isocyanatophenyl) thiophosphate and mixtures thereof as the polyisocyanate.

Sanitaryware obtainable using urethane (meth)acrylates a5), which are obtainable by reacting polyoxypropylene and/or polytetramethylene oxides, which each have at least three reactive, terminal hydroxyl functionalities, as the polyoxyalkylene is also convenient.

Sanitaryware arising from the use of (meth)acrylate systems comprising urethane (meth)acrylates as component a5) which have three or four reactive, terminal, ethylenically unsaturated functionalities is also of very particular interest.

Advantageous embodiments of the sanitaryware according to the invention are also obtained by the urethane (meth)acrylates' being obtainable by reacting polyoxyalkylenes having a weight average molecular weight in the range from 2000 to 20000.

Further features to achieve advantages may also be realised in the backed sanitaryware according to the invention in combination with the use according to the invention of urethane (meth)acrylates in the reinforcing layer.

In one particularly preferred embodiment, sanitaryware according to the invention is characterised in that the reinforcing material consists of a first and a second layer, wherein the first layer is obtainable by curing a polymerisable, cold-curing, reactive, first (meth)acrylate system sprayed onto the reverse of the acrylic polymer moulding, with the second layer likewise being obtainable by curing a second (meth)acrylate system, the layers, however, being distinctly different from one another.

Such two-layer reinforcement in which the first and second layers differ in that the (meth)acrylate systems used to form the corresponding layers differ from one another are of particular advantage. These differences in particular relate to the nature and/or content of components a3) and/or B). It should furthermore be noted that more than two backing layers are possible, and the use of urethane (meth)acrylates may, under certain circumstances, be restricted to only one backing layer of optionally two or more layers which are present.

Although all the requirements of DIN EN 198 may be met with only a one-layer reinforcement according to the invention, two-layer reinforcement has the advantages for the purposes of the invention that certain mechanical properties (especially impact strength) of the finished sanitaryware may be further improved.

The backing or reinforcing layer and likewise the at least two backing layers which reinforce the acrylic polymer moulding in a convenient variant of the invention are obtained by curing one or by curing two or more polymerisable, cold-curing, reactive (meth)acrylate systems, each of which is composed of components A) to D), which together constitute the binder, together with the fillers E).

This means in a first variant that a (meth)acrylate system forms the sole reverse reinforcing layer of moulded acrylic polymer sanitaryware.

This also means that in a second variant a first (meth)acrylate system forms a first reverse layer on the acrylic polymer moulding, while a second (meth)acrylate system forms a second reverse layer on the acrylic polymer moulding and the first reverse layer.

Although in the latter-stated case both, i.e. both the first and the second, (meth)acrylate systems may consist of components A) to E), the individual constituents are selected from the above-stated definitions with regard to nature and/or quantity in such a manner that the first and second (meth)acrylate systems differ distinctly from one another.

The Binder

The binder of a (meth)acrylate system is in turn composed of polymerisable monomers A), optionally (pre)polymers B) soluble or swellable in A), a redox system C) optionally together with further conventional additives D).

Component A)

Component A) is an essential constituent of the binder.

According to the invention, a mixture of monomers is used as the monomer A). In particular, component a5) is an essential constituent. In the vast majority of cases, a1) is also represented in the monomer component of the binder. The composition of component A) is:

| | |
|---|---|
| (meth) acrylate | 30–100 wt. % |
| methyl (meth)acrylate | 0–99.8 wt. % |
| $C_2$–$C_4$ (meth)acrylate | 0–99.8 wt. % |
| $\geq C_5$ (meth)acrylate | 0–50 wt. % |
| polyfunctional(meth)acrylates | 0–50 wt. % |
| urethane (meth)acrylates | 0.2–50 wt. % |
| comonomers | 0–70 wt. % |
| vinyl aromatics | 0–35 wt. % |
| vinyl esters | 0–35 wt. %, | wherein the monomers are selected such that, together, they amount to 100 wt. %.

Placing a constituent between brackets indicates that it is optionally usable, i.e. (meth)acrylate denotes acrylate and/or methacrylate.

The monomer component A) contains at least 30 wt. % (meth)acrylate, wherein monofunctional (meth)acrylates having a $C_1$–$C_4$ ester residue are preferred. Long-chain esters, i.e. those having a $C_5$ or longer chain ester residue are limited to 50 wt. % in component A).

In the stated quantity, long-chain (meth)acrylates increase the impact strength of the system. Accordingly, while these esters do indeed make the backing of the acrylic polymer moulding more flexible, they also make it softer, such that service characteristics would be impaired at quantities of greater than 50 wt. %.

Component A) preferably also contains polyfunctional (meth)acrylates. In the first case, $\geq C_5$ (meth)acrylates are preferably present in component A) in a quantity of 10–30 wt. %, particularly conveniently in a quantity of 15–25 wt. %.

In addition to the (meth)acrylates, component A) may also contain other comonomers, wherein the content thereof is restricted to 70 wt. %. Of these comonomers, vinyl aromatics and/or vinyl esters may each be present in component A) in a quantity of up to 35 wt. %. Higher contents of vinyl aromatics are difficult to incorporate by polymerisation and may cause the system to segregate. Higher contents of vinyl esters may furthermore cure only inadequately at low temperatures and have a tendency towards greater shrinkage.

Component A) is preferably synthesised from 80–100 wt. % and particularly preferably from 90–100 wt. % of (meth)acrylates as favourable processing and service characteristics of the backing may be achieved with these monomers. The proportion of $C_2$–$C_4$ esters in the (meth)acrylates is preferably restricted to 50 wt. % in component A), with these esters preferably being present in component A) in a quantity of at most 30 wt. % and particularly advantageously in a quantity of at most 20 wt. %.. Particularly flexible backing layers may be synthesised in this manner.

Suitable monofunctional (meth)acrylates are in particular methyl methacrylate, butyl methacrylate, butyl acrylate, 2-ethylhexyl acrylate, triethylene glycol ethyl ether methacrylate, hydroxypropyl methacrylate.

Suitable comonomers are in particular vinyltoluene, styrene, vinyl esters.

Styrene is preferably restricted to at most 20 wt. % in A), as a higher content disrupts cold-curing and a severe odour nuisance must be expected.

Polyfunctional (meth)acrylates are particularly advantageously present in component A), wherein the content thereof is conventionally in the range from 1 to 50 wt. % and usually from 1 to 10 wt. % in A). The polyfunctional (meth)acrylates provide polymer linkages between the linear molecules. In this manner, it is possible to influence properties such as flexibility, scratch resistance, glass transition temperature, melting point or curing characteristics.

Usable polyfunctional (meth)acrylates include, inter alia:
(1) Difunctional (meth)acrylates Compounds of the General Formula

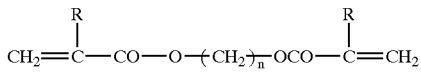

in which R is hydrogen or methyl and n is a positive integer between 3 and 20, such as for example the di(meth)acrylate of propanediol, butanediol, hexanediol, octanediol, nonanediol, decanediol and eicosanediol, compounds of the general formula:

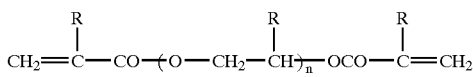

in which R is hydrogen or methyl and n is a positive integer between 1 and 14, such as for example the di(meth)acrylate of ethylene glycol, diethylene glycol, triethylene glycol, tetraethylene glycol, dodecaethylene glycol, tetradecaethylene glycol, propylene glycol, dipropylene glycol and tetradecapropylene glycol; and glycerol di (meth) acrylate 2,2'-bis-[ρ-(γ-methacryloxy-β-hydroxypropoxy) phenylpropane] or bis-GMA, bisphenol A dimethacrylate, neopentyl glycol di(meth)acrylate, 2,2'-di-(4-methacryloxypolyethoxyphenyl)propane having 2 to 10 ethoxy groups per molecule and 1,2-bis-(3-methacryloxy-2-hydroxypropoxy)butane.

(2) Tri- or polyfunctional (meth)acrylates
Trimethylolpropane tri(meth)acrylates and pentaerythritol tetra(meth)acrylate.

Preferred conventional polyfunctional (meth)acrylates include, inter alia, triethylene glycol dimethacrylate (TEDMA), trimethylolpropane trimethacrylate (TRIM), 1,4-butanediol dimethacrylate (1,4-BDMA), ethylene glycol dimethacrylate (EDMA).

Urethane (meth)acrylates comprise an essential monomer constituent of a (meth)acrylate system to be used according to the invention.

These are obtainable, for example, from isocyanate-functional prepolymers, into which olefinic double bonds are introduced by means of hydroxy-functional compounds, such as for example hydroxyethyl acrylate, hydroxyethyl methacrylate, alkyl alcohol, vinyl alcohol etc..

The isocyanate-functional prepolymers which are suitable for performing the invention are frequently addition products or condensation products of polyisocyanate compounds which have at least two free isocyanate groups and monomeric or polymeric polyols having at least two hydroxyl groups, including mixtures of such plyols. The reaction between the polyisocyanate and the polyols is performed using an excess of polyisocyanate in order to ensure that the reaction product has at least two free, unreacted isocyanate groups.

Polyols usable for the production of the isocyanate-functional prepolymers used according to the invention preferably have an average molecular weight of approx. 300 to approx. 3000. Suitable polyols include polyalkylene glycols, such as polyethylene glycols, polyether polyols, such as the compounds produced by addition polymerisation of ethylene oxide and a polyol, such as trimethylolpropane, in a ratio to provide unreacted hydroxyl groups in the product, organic hydroxylated elastomers having a freezing temperature (second order glass transition temperature) of below approx. 5° C., such as poly(butadiene/styrene) polyols and poly(butadiene) polyols, polyester polyols, as produced by polymerising polyols, for example diethylene glycol, trimethylolpropane or 1,4-butanediol, with polycarboxylic acids, such as phthalic acid, terephthalic acid, adipic acid, maleic acid or succinic acid, in a ratio to provide unreacted hydroxyl groups in the product; glyceride esters of hydroxylated fatty acids, such as castor oil, glycerol monoriconoleate, blown linseed oil or blown soya oil; as well as polyester polyols as produced, for example, by polymerising a lactone, such as ε-caprolactone.

Polyisocyanates which may be reacted with polyols to form isocyanate-functional prepolymers which are used according to the invention may be any desired monomeric, i.e. non-polymeric, isocyanate compounds having at least two free isocyanate groups, including aliphatic, cycloaliphatic and aromatic compounds. A non-limiting list of typical representatives of polyisocyanates includes: 2,4-tolylene diisocyanate, 2,6-tolylene diisocyanate, 4,4'-diphenylmethane diisocyanate, m- and p-phenylene diisocyanate, polymethylenepoly(phenyl isocyanate), hexamethylene diisocyanate, 4,4'-methylene-bis(cyclohexyl isocyanate), isophorone diisocyanate and other aliphatic, cycloaliphatic and aromatic polyisocyanates, including mixtures of such polyisocyanates. Cycloaliphatic and aromatic polyisocyanates are frequently preferred.

Urethane (meth)acrylates which may be used with particular success in the resin formulation according to the invention include, inter alia, one or more of the free-radically polymerisable compounds of the general formula A.I $$(H_2C=CR^1-C(=O)-O-R^2-O-C(=O)-NH-)_n R^3 \quad (A.I)$$

in which
$R^1$=hydrogen or a methyl group,
$R^2$ =a linear or branched alkylene group having 2 to 6 carbon atoms or alkylene oxides having 4 to 21 carbon atoms and
n=2 or 3,
wherein, where n=2, $R^3$ is:

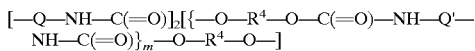

wherein m =0 to 10 and
$R_4$ is
a) a polycaprolactonediol residue
b) a polytetrahydrofurfuryl residue
or wherein, where n=3, $R^3$ is:

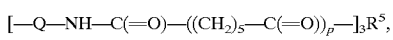

wherein $R^5$ is a triol residue of a linear or branched trihydric alcohol containing 3 to 6 carbon atoms and ρ=1 to 10 and
Q and Q' are mutually independently aromatic, aliphatic or cycloaliphatic groups containing 6 to 18 carbon atoms, which groups are derived from diisocyanates or diisocyanate mixtures.

The compounds of the formula (A.I) may be produced using processes known per se from the prior art by reacting an acrylate ($R^1$=H) or methacrylate ($R^1$=CH$_3$) containing hydroxyl groups in the ester group with compounds containing isocyanate groups to form a urethane group. The hydroxyalkyl acrylates or methacrylates contain alkyl groups which may be linear or branched and contain between 2 and 6 carbon atoms. According to the invention, it is also possible to use esters of acrylic and methacrylic acid with polyethylene glycol and/or polypropylene glycol. Such acrylates or methacrylates contain from 4 to 21 carbon atoms in the ester group, corresponding to 2 to 10 ethylene oxide units and 1 to 7 propylene oxide units. The production of such esters is known to the person skilled in the art.

Where n=2, the compounds of the general formula (A.I) comprise reaction products of acrylates or methacrylates containing hydroxyl groups with isocyanates, which are obtainable by reacting suitable diols with diisocyanates.

Suitable (meth)acrylates containing hydroxyl groups comply with the general formula A.II

$H_2C=CR^1—C(=O)—O—R^2—OH$ (A.II), in which $R^1$=hydrogen or methyl and $R^2$=ethylene.

Suitable acrylates or methacrylates are those in which $R^2$ contains an ethylene, propylene, isopropylene, n-butylene, isobutylene group or 4 to 7 ethylene oxide or propylene oxide units.

However, preferred compounds for the reaction of the isocyanates with the acrylates or methacrylates bearing hydroxyl groups are hydroxyethyl acrylate, hydroxyethyl methacrylate, 2-hydroxypropyl acrylate, 2-hydroxypropyl methacrylate, 3-hydroxypropyl acrylate, 3-hydroxypropyl methacrylate, 6-hydroxyhexyl acrylate, 6-hydroxyhexyl methacrylate, polyethylene glycol acrylate, polyethylene glycol methacrylate, polypropylene glycol acrylate and polypropylene glycol methacrylate.

The linear or branched alkyl groups having 1 to 8 carbon atoms for $R^3$ in particular comprise the methyl, ethyl, propyl, isopropyl, n-butyl, isobutyl, tert.-butyl, pentyl, isopentyl, neopentyl or hexyl groups.

The cycloalkyl groups having 3 to 12 carbon atoms preferably comprise those selected from the cyclopropyl, cyclobutyl, cyclopentyl, cyclohexyl and cycloheptyl groups.

Aromatic groups containing 6 to 18 carbon atoms which may in particular be mentioned are the phenyl, 2-toluenyl, 4-toluenyl and xylenyl groups, which are introduced by reacting the (meth)acrylates containing hydroxyl groups with the corresponding isocyanates.

The diols comprise a) polycaprolactonediols, b) polytetrahydrofurfuryldiols and c) special polyesterdiols. The molar ratio in the reaction of the diols with the diisocyanates may vary from a ratio of 1:1 to 1:1.1.

a) Polycaprolactonediols are obtainable using per se known processes by ring-opening polymerisation of caprolactone with suitable diols, wherein the ratio of caprolactone to diol is 1 to 20, i.e. 2 to 40 mol of caprolactone are used per mol of diol. The molecular weight of the polycaprolactonediol is between 200 and 4000.

Diols which may in particular be considered are linear or branched dihydric alcohols containing 2 to 6 carbon atoms which are selected from among ethylene glycol, 1,2-propanediol, 1,3-propanediol, 1,2-, 1,3- or 1,4-butanediol, 1,5-pentanediol, 2-methyl-1,4-butanediol, 2,2-dimethyl-1,3-propanediol, 1,2- or 1,6-hexanediol, 1,10-decanediol.

The reaction products prepared from the diol and caprolactone are then reacted using processes known to the person skilled in the art with aromatic, aliphatic or cyclic diisocyanates. Suitable diisocyanates, from which Q and, independently thereof also Q', are derived, are selected from among 2,4-toluene diisocyanate, 2,6-toluene diisocyanate, 4,4'-diphenylmethane diisocyanate (MDI), 4,4'-dicyclohexyl diisocyanate, meta- and para-tetramethylxylylene diisocyanate, 3-isocyanatomethyl-3,5,5- trimethylcyclohexyl isocyanate (isophorone diisocyanate), hexamethylene diisocyanate, 1,5-naphthylene diisocyanate, dianisidine diisocyanate, di-(2-isocyanatoethyl)bicyclo[2.2.1]hept-5-ene 2,3-dicarboxylate, 2,2,4- and 2,4,4-trimethylenehexamethylene diisocyanate and mixtures thereof.

The reaction product of the diol, the caprolactone and the diisocyanate is then reacted using per se known processes with the acrylate or methacrylate containing hydroxyl groups to yield the polyurethane (meth)acrylate.

b) The compounds of the formula I where n=2 derived from polytetrahydrofurfuryldiol are, in principle, synthesised in accordance with the same scheme as described in a). Polytetrahydrofurfuryldiol is first reacted with one of the diisocyanates stated above in a) and the reaction product arising therefrom is reacted with the above-stated acrylates or methacrylates containing hydroxyl groups of the formula Bl.II to yield the polyurethane (meth)acrylate. Reference is made to the relevant technical literature familiar to the person skilled in the art with regard to processes for reacting diols with diisocyanates. The molecular weight of the products is between 200 and 4500.

c) Particularly good results may be achieved for the purposes of the invention with urethane (meth)acrylates derived from special polyesterdiols.

It is accordingly especially convenient to use compounds of the general formula A.III

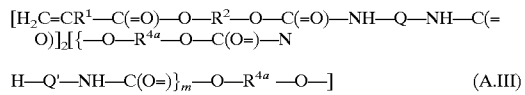

$[H_2C=CR^1—C(=O)—O—R^2—O—C(=O)—NH—Q—NH—C(=O)]_2\{—O—R^{4a}—O—C(O=)—N$ $H—Q'—NH—C(O=)\}_m—O—R^{4a}—O—]$ (A.III)

in which m=0 to 10, $R^1$=hydrogen or methyl group, $R^2$=a linear or branched alkylene residue having 2 to 6 carbon atoms or an alkylene oxide having 4 to 21 carbon atoms, Q and Q' are mutually independently aromatic, aliphatic or cycloaliphatic groups containing 6 to 18 carbon atoms, which groups are derived from the underlying diisocyanate or diisocyanate mixtures and $R^{4a}$ is derived from a polyesterdiol having a C:O ratio of >2.6, a C:H ratio of <10 and a molecular weight of 1000 to 20000.

Particularly good properties, in particular with regard to hydrophobing, are achieved by using the urethane (meth) acrylates of the general formula A.III. These urethane (meth) acrylates exhibit a particularly elasticising action.

$R^4$ corresponds to polyesterdiol residues which are derived from polyesterdiols which are characterised by a C:O ratio of >2.6, preferably of >3.0, and a C:H ratio of <10. These polyesterdiols are furthermore characterised by a molecular weight of 1000 to 20000, in particular of 1000 to 10000.

These special polyesterdiols are produced by reacting long-chain diols, in particular dimeric diol (hydrogenated dimeric fatty acid) with shorter-chain dicarboxylic acids containing 4 to 8 carbon atoms or the anhydrides thereof, in particular succinic acid or succinic anhydride. The polyesterdiols may also be produced by reacting shorter-chain diols containing 4 to 8 carbon atoms, in particular 1,6-hexanediol, with long-chain fatty acids, in particular dimeric fatty acid mixture prepared from dimerised fatty acids of acyclic and cyclic dicarboxylic acids having an average of 36 carbon atoms. It is, however, also possible to use mixtures of long-chain diols with shorter-chain diols, such as in particular mixtures of hexanediol and polyethylene glycol or of dimeric diol and diethylene glycol.

Linear or branched $C_2$–$C_{44}$ alkyldiols are generally preferred as the diols, such as ethylene glycol, 1,2- or 1,3-propylene glycol, 1,2-, 1,3- or 1,4-butanediol, neopentyl glycol, 1,2- or 1,6-hexanediol, 1,10-decanediol, 1,12-octadecanediol. Cyclic $C_6$-$C_{44}$ alkyldiols mayi however, also be considered.

Diols containing ethers, such as for example di-, tri- or tetraethylene or propylene glycol or the oligomeric homologues thereof are also preferred.

Linear or branched $C_2$–$C_4$4 alkyldicarboxylic acids are generally particularly preferred, such as oxalic acid, malonic acid, succinic acid, glutaric acid, adipic acid, pimelic acid, suberic acid, azelaic acid, nonanedicarboxylic acid, decanedicarboxylic acid, undecanedicarboxylic acid or the commercial mixtures thereof. Unsaturated C4–$C_{44}$ dicarboxylic acids, such as maleic acid, fumaric acid, itaconic acid or aconitic acid, may also be reacted with the diols.

Esterification may proceed using per se known processes in the presence of a catalyst in a suitable solvent at elevated temperature with azeotropic removal of the water of reaction. Tin(II) octoate is preferred as the catalyst and xylene as the solvent.

The resultant polyesterdiols are then reacted with one of the diisocyanates stated above in a) and subsequently reacted with the acrylates or methacrylates containing hydroxyl groups mentioned above in a) to yield the polyurethane (meth)acrylate. One or more of these polyurethane (meth)acrylates based on the special polyesterdiols may be used in a mixture with activators and optionally further conventional additives as an adhesive composition.

Where n =3, the compounds of the general formula (A.1) comprise reaction products of the above-stated acrylates or methacrylates containing hydroxyl groups with isocyanates, which are obtainable by the reaction of suitable linear or branched trihydric alcohols (triols) containing 3 to 6 carbon atoms with caprolactone and subsequent reaction with diisocyanates.

Polycaprolactonetriols are obtainable using per se known processes by ring-opening polymerisation of caprolactone with suitable triols, wherein the ratio of caprolactone to triol is 1 to 10, i.e. 3 to 30 mol of caprolactone are reacted with 1 mol of triol.

Triols which may in particular be considered are those selected from glycerol, 1,2,4-butanetriol, trimethylolpropane (2-hydroxymethyl-2-ethyl-1,3-propanediol) and trimethylolethane (2-methyl-2-hydroxymethyl-1,3-propanediol).

The reaction products prepared from the triol and caprolactone are then reacted using processes known to the person skilled in the art with the diisocyanates stated in a). The reaction product of the triol, the caprolactone and the diisocyanate is then reacted using per se known processes with the acrylate or methacrylate containing hydroxyl groups to yield the polyurethane (meth)acrylate.

Particularly convenient backings are obtained when certain novel urethane (meth)acrylates are used. These have at least three reactive, terminal, ethylenically unsaturated functionalities which are derived from (meth)acrylates.

They are obtainable by reacting hydroxyalkyl (meth) acrylic acid esters with polyisocyanates and polyoxyalkylenes having at least three hydroxyl functionalities, wherein the proportion of polyethylene oxide is less than 50 wt. %, relative to the total quantity of polyoxyalkylene.

Hydroxyalkyl (meth)acrylic acid esters are esters of (meth)acrylic acid with dihydric, aliphatic alcohols. These compounds are widely known in specialist circles. They may be obtained, for example, by reacting (meth)acrylic acid with oxiranes.

Oxirane compounds include, inter alia, ethylene oxide, propylene oxide, 1,2-butylene oxide and/or 2,3-butylene oxide, cyclohexene oxide, styrene oxide, epichlorohydrin and glycidyl esters. These compounds may be used both individually and as a mixture. The reaction to yield the hydroxyalkyl (meth)acrylic acid esters is described, for example, in DE-A-24 39 352, DE-15 68 838 and GB 1 308 250.

The hydroxyalkyl (meth)acrylic acid esters obtainable in this manner are frequently commercially available and are thus particularly suitable for the purposes of the invention.

The hydroxyalkyl (meth)acrylic acid esters may also contain substituents, such as for example phenyl residues or amino groups. The hydroxyalkyl residue of the ester may furthermore also contain polyoxyalkylene groups, which may be both linear and branched, such as for example polyethylene oxide, polypropylene oxide and polytetramethylene oxide. These groups frequently have between 2 and 10 oxyalkylene units.

Preferred hydroxyalkyl (meth)acrylic acid esters are, inter alia, hydroxyethyl acrylate, hydroxyethyl methacrylate, 2-hydroxypropyl acrylate, 2-hydroxypropyl methacrylate, 3-hydroxypropyl acrylate, 3-hydroxypropyl methacrylate, 6-hydroxyhexyl acrylate and 6-hydroxyhexyl methacrylate, 3-phenoxy-2-hydroxypropyl methacrylate, polyethoxy methacrylate, polypropoxy methacrylate, polyethylene oxide/polytetramethylene oxide methacrylate, polyethylene oxide/polypropylene oxide methacrylate, acrylic acid (4-hydroxybutyl ester), acrylic acid (2-hydroxyethyl ester), methacrylic acid (hydroxymethylamide), caprolactone hydroxyethyl methacrylate and caprolactone hydroxyethyl acrylate; of these, hydroxyethyl methacrylate, hydroxyethyl acrylate, 2-hydroxypropyl methacrylate and 2-hydroxypropyl acrylate are very particularly preferred.

For the purposes of the present invention, polyisocyanates comprise low molecular weight compounds containing two or more isocyanate groups per molecule.

The range of elongation at break and tear strength properties may purposefully be influenced by selecting the content of polyisocyanates having 3 or more isocyanate groups. The higher is the content of compounds having three or more functionalities, the greater is the tear strength. However, this is accompanied by a sharp reduction in elongation at break. It has accordingly been established that the content of these polyisocyanates having three or more functionalities should be no greater than 10 wt. %, preferably no more than 5 wt. %, relative to the total mass of polyisocyanates. However, these explanations relate solely to the production of the particularly favourably usable urethane (meth)acrylates according to embodiment A), as described above. In embodiment B), in which polyoxyalkylenes having two hydroxyl groups are linked by polyisocyanates having three or more isocyanate groups, the content of polyisocyanates having three or more functionalities is correspondingly higher.

Polyisocyanates usable in the present invention include, inter alia, 2,4-toluene diisocyanate, 2,6-toluene diisocyanate, 4,4'-diphenylmethane diisocyanate (MDI), 4,4'-dicyclohexyl diisocyanate, meta- and para-tetramethylxylylene diisocyanate, 3-isocyanatomethyl-3,5, 5-trimethylcyclohexyl isocyanate (isophorone diisocyanate), hexamethylene diisocyanate, 1,5-naphthylene diisocyanate, dianisidine diisocyanate, di-(2-isocyanatoethyl)-bicyclo[2.2.1]hept-5-ene 2,3-dicarboxylate, 2,2,4- and 2,4,4-trimethylenehexamethylene diisocyanate, triphenylmethane 4,4',4"-triisocyanate, tris-(4-isocyanatophenyl) thiophosphate and mixtures thereof.

Suitable polyisocyanates may, for example, also be obtained by reacting polyhydric alcohols with diisocyanates or by polymerising diisocyanates. It is furthermore also possible to use polyisocyanates which may be prepared by reacting hexamethylene diisocyanate with small quantities of water. These products contain biuret groups.

These compounds are widely known in specialist circles and most are commercially available. These include, inter alia, ®Desmodur H, ®Desmodur N 100, ®Desmodur N 3300 (from BAYER), ®Basonat PLR 8401, ®Basonat PLR 8638 (from BASF), ®Tolonate HDB 75 MX, ®Tolonate HDT 90 (from Rhône Poulenc), ®Vestanat IPD, ®Vestanat T 1890/100 and ®Vevestanat T 2960 (from Hüls).

Compounds having isocyanate groups of differing reactivities are preferred. This characteristic facilitates control of the reaction, but is not intended to constitute any restriction. One example of such a preferred polyisocyanate is isophorone diisocyanate.

For the purposes of the present invention, the analogous isothiocyanates are also suitable as the polyisocyanates. However, since these compounds are less readily available commercially, they are less preferred.

Polyoxyalkylenes having at least three hydroxyl functionalities may be obtained, for example, by polyaddition of cyclic ethers, such as for example oxiranes and tetrahydrofuran.

Oxiranes which may be used for polyaddition include, inter alia, those stated above. Of these, propylene oxide is preferred.

In order to obtain at least three hydroxyl functionalities which may react with isocyanate groups, it is, for example, possible to use alcohols having at least three hydroxyl groups as starter molecules.

These include, inter alia, glycerol, trimethylolpropane, erythritol, pentaerythritol, sorbitol and inositol; of these, glycerol is preferred.

The polyaddition of cyclic ethers onto polyhydric alcohols is widely known in specialist circles. The person skilled in the art will find valuable indications in, for example, Ullmann's Encyclopedia of Industrial Chemistry, 5th edition, headword "polyoxyalkylenes".

Polyoxyalkylenes having three or more hydroxyl functionalities may furthermore be produced in situ. This is achieved in variant B) by linking polyoxyalkylenes having two hydroxyl functionalities with polyisocyanates having three or more isocyanate groups.

The weight average molecular weight of the polyoxyalkylenes may vary within wide ranges. It is preferably in the range from 2000 to 20000, preferably in the range from 4000 to 10000 and very particularly preferably in the range from 4000 to 8000 g/mol. It is, however, essential that the polyether chains induce a minimum of flexibility. The number average chain length of the polyether chain should accordingly be greater than 10 units, preferably greater than 20 units and very preferably greater than 30 units.

The above-stated cyclic ethers may also be used as a mixture, in which case copolymers are obtained. Block copolymers of this type may also be used.

Some polyoxyalkylenes having at least three hydroxyl functionalities are commercially available.

Preferred polyoxyalkylenes are polyoxypropylenes. Polytetramethylene oxides, which may be used together with the polyoxypropylenes, may also be preferred, wherein these polyoxyalkylenes each have at least three reactive, terminal hydroxyl functionalities.

It is assumed that at least a proportion of the particularly convenient novel urethane (meth)acrylates may be described by the following formula (A.IV):

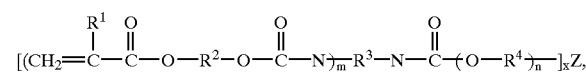

(A.IV)

in which

R$^1$ is hydrogen or methyl,

R2 is a linear or branched alkylene group having 2 to 20 carbon atoms or alkylene oxides having 4 to 50 carbon atoms, R$^3$ represents an aromatic, aliphatic or cycloaliphatic group containing up to 18 carbon atoms, which group is derived from diisocyanates or diisocyanate mixtures, R$^4$ represents an alkylene residue having at least 2 carbon atoms, providing that at least half of all the residues R$^4$ of the urethane (meth)acrylate of the formula (I) have 3 or more carbon atoms, m is an integer $\geq 1$, n is an integer $\geq 10$, x is an integer $\geq 3$ and Z is a compound group derived from alcohols having at least three hydroxyl groups or from polyisocyanates having at least three isocyanate groups.

The term "alkylene" means a divalent residue which is obtained by removing two hydrogen atoms, each from a non-adjacent carbon atom of an original hydrocarbon and includes alkylenes having from 3 to 18 carbon atoms, including for example 1,3-propylene, 1,4-butylene, 1,5-pentylene, 1,8-octylene and 1,10-decylene. These residues may be branched as well as linear. These groups may furthermore be substituted.

The groups R$^2$ to R$^4$ and the numbers m and n are derived from the starting materials used in the reaction. These are described above. Accordingly, m preferably equals 1, but tear strength may be increased by also using polyisocyanates having three or more functionalities, such that a proportion of the molecules may thus be represented by formulae in which m is >1.

The compound group Z and the number x are also dependent upon the starting materials. The residue Z and the parameter x may moreover also be influenced by reaction conditions and the quantity ratios of the starting materials. If, for example, glycerol is selected as Z, compound groups of the formula (A.V)

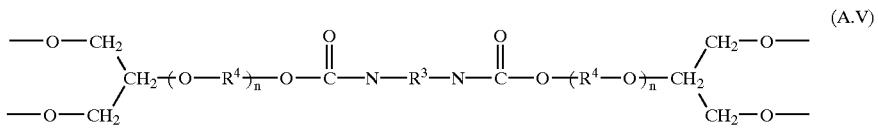
(A.V)

may also, inter alia, be formed, which may be obtained by coupling two polyoxyalkylenes with polyisocyanates, wherein R³, R⁴ and n have the above-stated meaning. It is, however, also conceivable that macromolecules may be formed by coupling more than two polyoxyalkylenes.

Urethane (meth)acrylates which are particularly preferred for the present invention have three or four reactive, terminal, ethylenically unsaturated functionalities.

Urethane (meth)acrylates preferred for the invention may be produced by processes in which i) at least one hydroxyalkyl (meth)acrylic acid ester is reacted with ii) at least one polyisocyanate and iii) at least one polyoxyalkylene.

Various reactions are conceivable for this purpose. Urethane (meth)acrylates for the present invention may accordingly be produced in a two-stage synthesis. In this case, equimolar quantities of hydroxyalkyl (meth)acrylic acid ester and polyisocyanate are, for example, reacted, whereupon the resultant reaction product is reacted with a suitable quantity of polyoxyalkylene. If suitable polyisocyanates are selected or if the reaction is appropriately controlled, it is possible in this manner in particular to obtain urethane (meth)acrylates having three reactive, terminal, ethylenically unsaturated functionalities.

It is furthermore conceivable to perform the reaction in a single step. In this case, a mixture of urethane (meth)acrylates having a differing number of ethylenically unsaturated functionalities is obtained. It has been found that, when trifunctional polyoxyalkylenes are used, tetrafunctional urethane (meth)acrylates are obtained having compound groups of the formula (A.V), as were shown above by way of example. The mixtures obtained in this manner may be used as an additive to the (meth)acrylate resins without further purification.

The reaction may be performed without solvent, i.e. without using an additional solvent. If desired, an inert solvent may also be used. Such solvents include, inter alia, benzene, toluene and methyl isobutyl ketone (MIBK), methyl ethyl ketone (MEK).

The reaction of the isocyanate groups with the hydroxyl groups is widely known in specialist circles. The reaction temperature may thus vary within a wide range, but is frequently within the range from 30° C. to 120° C., preferably in the range from 60° C. to 90° C. A similar situation applies with regard to the pressure at which the reaction is performed. The reaction may accordingly proceed under both reduced and elevated pressure. Preferably, however, the reaction is performed at standard pressure. The reaction may proceed both in air and under a protective gas atmosphere, wherein a low oxygen content is preferably present, as this inhibits possible polymerisation.

The reaction is frequently accelerated by using catalysts, such as for example tertiary amines, which include, inter alia, 1,4-diazabicyclo[2.2.2]octane, N-methylmorpholine, N,N-diethylcyclohexylamine and N,N,N',N'-tetramethyldiaminomethane, or organotin compounds, which include, inter alia, dibutyltin dilaurate and tin dioctoate. These catalysts, and the quantities in which these compounds are used, are widely known in specialist circles and are described, for example, in Ullmann's Encyclopedia of Industrial Chemistry, 5th edition, headword "polyurethanes".

Inhibitors which prevent free-radical polymerisation of the (meth)acrylates during the reaction may be added during the reaction. These inhibitors are widely known in specialist circles.

Component B)

Component B) is essential.

A polymer or prepolymer B) is added to component A) in order to adjust the viscosity of the binder and the overall rheology of the system and in order to improve curing. This (pre)polymer should be soluble or swellable in A). 0.05 to 5 parts of the prepolymer B) are used per 1 part of A). Poly(meth)acrylates are in particular suitable, wherein these may be dissolved in A) as a solid polymer or wherein a "syrup" may be used, i.e. partially polymerised compositions of suitable monomers. Polyvinyl chloride, polyvinyl acetate, polystyrene, epoxy resins, epoxy (meth)acrylates, unsaturated polyesters, polyurethanes or mixtures thereof are furthermore suitable. In the binder, these polymers, for example, impart special flexibility characteristics, control shrinkage, act as a stabiliser, skinning agent or flow improver.

The backing layers preferably contain 10–30 wt. %, particularly advantageously 15–20 wt. % of a high molecular weight polymer B), for example poly(meth)acrylate, relative to the sum of A)+B).

In a preferred embodiment, the weight ratio of components B) and A) of the binder is in the range from 0.1:1 to 2:1. This ensures optimum results.

Weight ratios of B):A) in the range from 0.2:1 to 1:1 are particularly convenient.

The component B) (pre)polymer may be a suspension polymer, emulsion polymer and/or ground pellets from recycling processes. In this case, the average particle diameter of the prepolymers is conventionally <0.8 mm.

Prepolymer B) very particularly advantageously comprises PMMA lacquer beads obtainable by suspension polymerisation. This in particular also permits single-layer reinforcement which exhibits adequate impact strength.

The average particle diameter of the lacquer beads is here approx. 0.1–0.8 mm. A diameter of 0.2–0.8 mm, in particular of 0.4–0.8 mm, is preferred.

(Pre)polymer B) preferably comprises a copolymer, wherein the hardness and flexibility of the reinforcing layers may be influenced by the nature and quantity of the comonomers in the (pre)polymer B). Usable comonomers involved in the synthesis of the particular (pre)polymer B) include, inter alia, acrylates and methacrylates other than methyl methacrylate (MMA), vinyl esters, vinyl chloride, vinylidene chloride, styrene, α-methylstyrene and the various halo-substituted styrenes, vinyl and isopropenyl ethers, dienes, such as for example 1,3-butadiene and divinylbenzene.

Preferred comonomers for methyl acrylate are, inter alia, ethyl acrylate, butyl acrylate, 2-ethylhexyl acrylate, ethyl methacrylate, n-butyl methacrylate, i-butyl methacrylate, 2-ethylhexyl methacrylate, propyl acrylate, propyl methacrylate, methacrylic acid, triethylene glycol ethyl ether methacrylate, hydroxypropyl methacrylate.

In the presence of two or more reinforcing layers, the comonomer content of the prepolymers B) is favourably 30–80% for the first reinforcing layer and favourably 0<30% for the second reinforcing layer, in each case relative to the entire weight of the monomers or monomer units involved in the synthesis of a prepolymer B.

Component C)

Component C) is an essential component of the binder and thus of each reinforcing layer.

The binder ( A) to D) ) to be used in the (meth)acrylate according to the invention is in each case suitable for cold-curing, i.e. it contains for the purposes of polymerisation a redox system comprising an accelerator and a peroxide catalyst or initiator, wherein these components are added in a sufficient quantity for cold-curing component A). The redox system is conventionally used in a quantity of 0.1001 to 15 wt. %, relative to the entire weight of the binder comprising the sum of the weights of components A) to D).

Obviously, either the redox system or at least parts thereof should be kept segregated from the polymerisable components of the binder until the desired time of polymerisation.

The accelerator is conventionally used in A) to D) in a quantity of 0.01 to 5 wt. %, particularly advantageously of 0.5 to 1.5 wt. %.

Suitable accelerators are, in particular, amines and mercaptans, with dimethyl-p-toluidine, diisopropoxy-p-toluidine, diethylol-p-toluidine, dimethylaniline and ethylene glycol dimercaptoacetate being preferred. Organic metal salts, which are conventionally used in A) to D) in a range from 0.001 to 2 wt. %, are also suitable as accelerators. Examples of suitable compounds are cobalt naphthenate, copper naphthenate, cobalt oleate, copper oleate.

Dibenzoyl peroxide and dilauroyl peroxide are in particular suitable as the peroxide catalyst. The peroxides are conventionally used in the binder in a quantity of 0.1 to 10 wt. % and in particular of 0.5 to 5 wt. %. An aqueous 40% suspension of desensitised dibenzoyl peroxide (for example Cadox 40 E from Akzo) is conveniently used as the peroxide catalyst for the system.

Of component C), the binder may already contain the accelerator, for example dimethylparatoluidine, without polymerisation occurring at ambient temperature. The reaction is initiated by adding the remaining constituents of component C), wherein component C) is conventionally calculated such that the (meth)acrylate system has a pot life in the range from 10 min to 30 min.

The (meth)acrylate system according to the invention accordingly contains the complete component C) only immediately before application; until the system is used, component C) is not present or is present only in part.

Solvent-free curing agent components are very particularly preferably used.

Component D)

Component D) is an optional component.

The binder ( A) to D) ) may contain conventional additives D), as are frequently used in reactive (meth)acrylate systems.

The quantity of these conventional additives may be from 0 to 50 wt. %, preferably from 0 to 30 wt. % and particularly preferably from 0 to 20 wt. %, in each case relative to the sum of the weights of component A) to D).

The purpose of these additives is, for example, to eliminate oxygen inhibition, with additives suitable for this purpose in particular being paraffins in a quantity of 0.05 to 5 wt. % in the binder ( A) to D) ) and/or phosphites in a quantity of 0.01 to 1 wt. % in A) to D), and also to form a polymer skin (paraffin-free). In the latter case, extremely high molecular weight polymers may, for example, be used as the additive, especially when methyl methacrylate is being used alone, in order to obtain an uninhibited surface without paraffin. During curing, methyl methacrylate vaporises at the surface, forming a polymer skin and leaving a tack-free surface.

Defoaming agents, wetting agents, thixotroping agents, inhibitors, flatting agents, blueing agents, UV stabilisers, chain transfer agents may furthermore be added.

Of these, thixotroping agents are particularly preferred. The purpose of these latter agents is to improve the storage stability and settling behaviour of particles in the resin components.

In a preferred embodiment, the backed sanitaryware of the invention is accordingly characterised in that at least one of the resin systems used for the backing contains, relative to the fillers E), up to 0.5 parts of thixotroping agent per 1 part of particles E).

Conventional thixotroping agents are, for example, silica, for example Aerosil®200, Aerosil®300.

Fillers (Component E)

An optional constituent of the (meth)acrylate system is component E), namely one or more filler(s) which is/are preferably inert under the depolymerisation conditions for (meth)acrylates.

These preferably comprise finely divided fillers, i.e. those having a fineness of $\leq 100\,\mu$m, used in a quantity of 0–75 wt. %, relative to the sum of A) to E). This in turn means that component E) may be used in at most a three-fold excess relative to the binder A). In other words, between 0 and 3 parts of E) may be used per 1 part of A) to D).

For the purposes of the invention, fillers which are inert under the depolymerisation conditions for (meth)acrylates are here taken to mean those substances which do not substantially impede or even prevent the depolymerisation of acrylate polymers.

Acrylate polymers, especially PMMA, are among the few plastics which are ideally suitable for direct chemical recycling. This should be taken to mean that, at certain temperatures and pressures, these polymers may be completely decomposed to reform the corresponding monomer units (depolymerisation), if heat is supplied in a suitable manner. Various continuous and discontinuous processes have been described in the literature and in patents for depolymerising polymethyl methacrylate (PMMA) and recovering the monomeric methyl methacrylate (MMA) so formed, by heat treating acrylic polymer waste at temperatures of >200° C., condensing the resultant monomer vapours and working up the crude monomers. In the process most frequently used industrially, the polymer material is introduced into a vessel partially filled with lead which is heated from the outside. At temperatures of above 400° C., the polymer material depolymerises and the resultant monomer vapours pass through piping into a condenser, where they are condensed to form a crude, liquid monomer. Such depolymerisation processes are known, for example, from DE-OS 21 32 716.

The fillers E), as are used for the purposes of the invention, must not be substances nor must they yield decomposition products during depolymerisation which prevent or unnecessarily complicate working up of the crude, liquid monomer, which is to be recycled in the depolymerisation process. Preferred fillers are accordingly those which collect on the surface of the metal as slag and may be removed, for example, during operation of the reactor with a rake, vane or the like. Using fillers E) according to the invention accordingly yields backed sanitaryware whi ch is completely recyclable.

Mineral fillers are usually used as the fillers. Fillers advantageously usable for the purposes of the invention in a single or in the first and/or second (meth)acrylate system include mica, aluminium hydroxide, calcitic fillers, such as for example chalk and marble, quarzitic fillers such as wollastonite, cristobalite and similar, amorphous silicates, fly ash, silicon carbide and/or barytes.

Of these, mica, aluminium trihydrate (aluminium hydroxide, quarztitic and calcitic fillers are particularly suitable for the purposes of the invention. The use of mica is extremely advantageous, both in the first and second (meth)acrylate systems or also in the (meth)acrylate system of a one-layer reinforcement.

The fillers E) are used either alone or in a combination of two or more. As already stated, the quantity is between 0 and 75 wt. %, relative to the sum of components A) to E) of the binder+fillers.

If the content of fillers E) is greater than 75 wt. %, this may impair the mixing and processing characteristics of the backing material; in particular, a mixture having such a high filler content cannot readily be sprayed or pumped. Moreover, at relatively high filler contents, it is no longer possible to ensure that sufficient binder is available to provide a stable coating.

On the other hand, a relatively high content of fillers E) is preferred. In particular, the highest possible quantity is desired on cost grounds. Fillers E) are preferably present in a quantity of 40–65 wt. %, particularly preferably in a quantity of 50–60 wt. %, in each case relative to the sum of components A)–E).

Smooth fillers are preferred for the purposes of the invention. These should be taken to mean particles having the smoothest possible surfaces. The particle size of the fillers according to the invention is $\leq 100 \mu m$. These are thus ultra-finely divided fillers. The particle size of the fillers E is determined by screen analysis and the stated size is preferred in order to permit processing of the system comprising filler E)+binder A)–D). Especially when processing is by spraying, the size of the filler particles is restricted by the nozzle system used. The person skilled in the art should, however, adjust the size of the filler particles E) to the requirements of the processing system.

Moreover, small particles having a smooth surface are more readily enveloped in the binder, have a reduced tendency towards aggregation and form no air cushions in the reinforcing layer.

One particular variant of backed sanitaryware of the invention is accordingly characterised in that the fillers E) of the (meth)acrylate system which cures to form the first reverse layer, have a fineness of $\leq 30 \mu m$. Such ultra-finely divided fillers permit particularly clean and simple curing of the first layer and straightforward application of the second layer.

Particularly convenient embodiments of fillers comprise certain microparticles. Such particles should be taken to mean particles having an average size in the range from 1 to 1000 $\mu m$. A size of 1 to 500 $\mu m$ is convenient. 10 to 250 $\mu m$ is preferred. Average particle diameters of 50 to 200 $\mu m$ are very particularly advantageous.

A whole range of microparticles may be used for the reinforcing layer according to the invention. Hollow particles, which may be regular or irregular, but are preferably spherical and contain inert gas in the cavity thereof, are particularly advantageous.

In the case of spherical hollow microspheres, the average particle diameter of reinforcing particles useful for the purposes of the invention is in the range from 1 to 1000 $\mu m$. The average external diameter of the hollow microspheres is preferably 1 to 500 $\mu m$. Particular embodiments comprises hollow microspheres having average particle diameters of between 10 and 250 $\mu m$. Average particle diameters in the range from 50 to 200 $\mu m$ are extremely convenient.

Hollow microspheres usable as component E) in principle include hollow microspheres made from various materials, such as for example glass, metals, metal oxides, polymers and organic compounds.

Hollow plastics microspheres are preferably used for the invention.

In the present invention, hollow microspheres are particularly preferably used as component E) for the reinforcing layer which consist of polymers, such as for example polystyrene, polyvinyl chloride, polyvinylidene chloride, polyvinyl acetate, polyacrylate, polyacrylonitrile, polybutadiene, polyethylene terephthalate; hollow microspheres made from copolymers or terpolymers based on such monomers as form the stated copolymers are furthermore preferred.

Examples of such polymers and copolymers which themselves form the hollow spheres are, inter alia, vinylidene chloride/acrylonitrile copolymer, polyvinylidene chloride, acrylonitrile/vinylidene chloride copolymer, acrylonitrile/methacrylonitrile copolymer, acrylonitrile/divinylbenzene/vinylidene chloride copolymer and the like.

Mixtures of hollow microspheres may preferably also be used as component E) for the purposes of the invention.

The hollow microspheres or microparticles usable according to the invention may be provided with coatings to adjust processing characteristics or to vary reinforcing properties.

Variations of the simple hollow microspheres are also particularly suitable. For example, hollow micrspheres which are of particular interest are those consisting of polymers which are covered (coated) with mineral substances in order to ensure better resistance to the influence of the surrounding medium (methacrylate resin).

The coating of the hollow microspheres may consist of ultra-finely divided minerals, such as for example calcium carbonate, quartz, mica, aluminium hydroxide, cristobalite and the like.

Hollow microspheres which are particularly preferred are in particular those made from plastics which are coated with calcium carbonate.

The hollow microspheres which are particularly favourable as component E) for the purposes of the invention may, in principle, in addition to other methods, be produced in the following ways:

♦ A core (lost core) is coated with the material concerned, then the core is removed by various methods (for example dissolution in a solvent, vaporisation or volatilisation), such that only the shell is left. This method is primarily used to produce hollow microspheres from ceramic materials and metal oxides.

♦ Production using a nozzle reactor system: In this process, the gas in the hollow microspheres and the liquefied material for the shell of the spheres are sprayed through specially designed nozzle systems (concentric orifices). The liquefied material cools in a kind of spray tower and solidifies to form a hollow microsphere filled with the particular gas (for example $H_2O$, $CO_2$, $SO_2$, air, $N_2$, etc.). This method is primarily used to produce hollow microspheres from polymeric materials.

♦ Phase separation of emulsions by liquid extraction: In this process, the spherical particles filled with liquid (micelles) present in an emulsion are separated from the surrounding liquid and then dried. This method is primarily used to produce hollow microspheres from metal oxides, but also from polymers.

A review of the production of hollow microspheres may be found, for example, in Mat. Res. Soc. Symp. Proc. vol. 372, 1995, Materials Research Society, authors David L. Wilcox Sr. and Morris Berg, pp. 3 to 13, and the literature cited therein.

Particularly suitable types of gas-filled, plastics hollow microspheres include, inter alia, ®Dualite types, for example, ®Dualite M 6017AE, (Pierce & Stevens Corp.); ®Expancel types, for example, ®Expancel 642 WU, ®Ropaque types, for example, ®Ropaque OP 62 (Rohm and Haas Co.), Matsumoto Microsphere, for example Microsphere F-30E (Matsumoto Yushi Seiyaku Co. Ltd.) and the like.

In one particular development of the sanitaryware according to the invention, said sanitaryware contains the microspheres in the (meth)acrylate system in a quantity in the range from 1 to 25 wt. %, relative to the weight of the sum of constituents A)–E).

The entire reinforcement is conventionally 1.5 to 10 mm thick. Two layers together are generally likewise approx. 1.5 to 10 mm thick. It is advantageous in this connection to make the first layer thinner and the second layer thicker than the first layer. The second layer is advantageously 2 to 3 times thicker than the first. In any event, the entire reinforcement is advantageously 1.5 to <8 mm thick.

The first layer is conveniently of a thickness in the range from 0.5–2.5 mm and the second layer of a thickness in the range from 3–<5.5 mm.

The present invention also provides a process for the production of backed sanitaryware containing neither glass fibre nor asbestos, in which a reactive resin system is sprayed onto the reverse of an acrylic polymer moulding, wherein the resin system cures in contact with the acrylic polymer moulding, so bonding to the acrylic polymer moulding, wherein the process is characterised in that a resin system predominantly based on (meth)acrylates is used, which cures to yield a polymer having a glass transition temperature Tg of >70° C. and, relative to 1 part by weight of the resin system, contains up to 2.33 parts by weight of such fillers which are inert under the depolymerisation conditions of the acrylic polymer moulding, wherein the resin system is of the composition stated herein.

In one variant, the process is preferably performed in such a manner that two different resin systems predominantly based on (meth)acrylates are used in succession, which systems each cure to yield a polymer having a glass transition temperature Tg of >70° C. and, relative to 1 part by weight of the resin system, contain up to 2.33 parts by weight of such fillers which are inert under the depolymerisation conditions of the acrylic polymer moulding, wherein a first resin system is initially sprayed onto the acrylic polymer moulding, which resin system imparts the requisite impact strength, and, after curing thereof, a second resin system is sprayed thereon, which second system imparts the requisite rigidity.

It is known from EP-A-0 693 503 to apply a (meth) acrylate based resin system by spraying. Analogously thereto, in a preferred variant according to the invention, two layers are applied in succession, wherein attention is additionally paid in the selection of the possible fillers to the innocuousness thereof during depolymerisation of the polymers, a 100% recyclable product is obtainable by carefully tailoring the selected materials (both the moulding and backing are based on (meth)acrylates, the fillers are inert) and the application process for the backing layers, which product, by virtue of the spraying process, may simultaneously be manufactured in a manner which is particularly straightforward and economical of materials.

Moreover and above all, glass fibre is avoided whether one, two or more layers are used.

In order to improve the settling behaviour of the fillers E) over extended periods of storage prior to use and so to increase storage stability, it is preferred that the fillers E) are incorporated into the first and/or second binder system A)–D) before use of the reactive resin system using a homogenising apparatus with addition of a thixotroping agent in a quantity of 0.01–0.5 parts relative to 1 part of E).

The size and shape of the filler particles are moreover positively influenced by using a suitable homogenising apparatus during the production of the resin system.

The reinforcing layer may be applied onto the acrylic polymer moulding using any desired method. Such methods include, inter alia, application, spraying, casting and the like. The reinforcing layer is preferably sprayed onto the reverse of the acrylic polymer moulding. In this case, two streams of materials are preferably mixed together during spraying, wherein a first material stream comprises the polymerisable constituents of the resin mixture and a second material stream comprises the constituents of component C) which are to be kept segregated from the polymerisable constituents of the resin system until polymerisation.

Spraying is preferably performed using high pressure airless spraying systems (for example Applikator IP 8000 from ESSKA, Hamburg), flat jet spraying systems from Glascraft or a two-component metering and mixing system with an operating pressure of 40 to 60 bar (for example "Twin-Injection" from Reinhardt Technik, Kierspe). When such systems are used, especially the fan jet process, coatings may be applied while simultaneously significantly reducing emissions. This may advantageously be achieved with spray guns which allow individual adjustment of loss-free laminate application.

Particularly suitable mixing and atomising processes are the subject matter of EP 38 481.

The process of the invention is in particular distinguished in that it may be performed at ambient temperature, i.e. conventionally between 0 and 35° C., but also, if desired, extreme temperatures such as −10 to +45° C.

The following Practical Examples and Comparative Examples illustrate the invention in greater detail.

COMPARATIVE EXAMPLE 1 (VB1)

One-layer reinforcement without hollow microspheres, thickness approx. 3 mm, binder without urethane (meth) acrylate;

40.00 parts by weight of a binder consisting of

---

18.00% of polymethyl methacrylate
75.00% of methyl methacrylate
5.00% of triethylene glycol dimethacrylate
0.50% of paraffins (melting point <56 C.)
0.50% of dimethylparatoluidine -continued

| |
|---|
| 0.50% of diisopropoxyparatoluidine |
| 0.50% of additives, stabilisers | are stirred for 4 hours with

| |
|---|
| 60.00 parts by weight of mica (<100 μm) and |
| 0.10 parts by weight of thixotroping agent (Byk 410). |

The mixture has a viscosity of 11000–13000 mPas.

This mixture is applied onto the shaped acrylic polymer moulding at a spray pressure of 180 bar using an Applikator IP 8000 model high pressure airless sprayer together with Cadox 40 E in a ratio by volume of 100:2 to 100:5. The application rate is 6–7 kg/m². No manual secondary finishing is required. A backing layer of a thickness of approx. 3 mm is obtained.

At a curing agent addition of 100:2, the curing time is approx. 15–25 min.

At a curing agent addition of 100:4, the curing time is approx. 5–15 min.

COMPARATIVE EXAMPLE 2 (VB2)

Two-layer reinforcement, neither layer with hollow microspheres, combined thickness of both layers together approx. 6 mm, binder without urethane (meth)acrylate;

(i) first reverse reinforcing layer 40.00 parts by weight of a binder consisting of

| |
|---|
| 30.00% of polymethyl methacrylate |
| 42.00% of methyl methacrylate |
| 25.70% of 2-ethylhexyl acrylate |
| 0.50% of triethylene glycol dimethacrylate |
| 0.80% of diisopropylolparatoluidine |
| 0.70% of dimethylparatoluidine |
| 0.30% of paraffins (melting point <56° C.) | are stirred for 4 hours with

| |
|---|
| 60.00 parts by weight of calcium carbonate (<100 μm) and |
| 0.10 parts by weight of thixotroping agent (Byk 410). |

The mixture has a viscosity of 6000–10000 mPas.

This mixture is applied onto the shaped acrylic polymer moulding at a spray pressure of 180 bar using an Applikator IP 8000 model high pressure airless sprayer together with Cadox 40 E in a ratio by volume of 100:2 to 100:5. No manual secondary finishing is required. The application rate is 2–4 kg/m At a curing agent addition of 100:2, the curing time is approx. 15–40 min.

At a curing agent addition of 100:5, the curing time is approx. 5–20 min.

A second layer of the following mixture is then applied by spraying:

(ii) second, outer reinforcing layer 40.00 parts by weight of a binder consisting of

| |
|---|
| 18.00% of polymethyl methacrylate |
| 75.00% of methyl methacrylate |
| 5.00% of triethylene glycol dimethacrylate |
| 0.50% of paraffins (melting point <56° C.) |
| 0.50% of dimethylparatoluidine |
| 0.50% of diisopropylolparatoluidine |
| 0.50% of additives, stabilisers | are stirred for 4 hours with

| |
|---|
| 60.00 parts by weight of mica (<100 μm) |
| 0.10 parts by weight of thixotroping agent (Byk 410). |

The mixture has a viscosity of 11000–13000 mPas.
Curing agent addition is 100:2 to 100:5.
Spraying pressure is 180 bar.
The application rate is 6–10 kg/m².
The curing time is 15–30 minutes at a curing agent addition of 100:2.
At a curing agent addition of 100:5, the curing time is approx. 5–15 min.

COMPARATIVE EXAMPLE 3 (VB3)

One-layer reinforcement with hollow microspheres, thickness of backing layer approx. 3 mm, binder without urethane (meth)acrylate;

40.00 parts by weight of a binder consisting of

| |
|---|
| 18.00% 6f polymethyl methacrylate |
| 75.00% of methyl methacrylate |
| 5.00% of triethylene glycol dimethacrylate |
| 0.50% of paraffins (melting point <56° C.) |
| 0.50% of dimethylparatoluidine |
| 0.50% of diisopropoxyparatoluidine |
| 0.50% of additives, stabilisers | are stirred for 4 hours with 54.00 parts by weight of mica (<100 μm)

6.00 parts by weight of gas filled hollow acrylonitrile copolymer microspheres coated with calcium carbonate and having an average particle size of approx. 95 μm of the type ®Dualite 6032 from Pierce & Stevens Corporation and 0.10 parts by weight of thixotroping agent (Byk 410).

The mixture has a viscosity of 11000–13000 mpas.

This mixture is applied onto the shaped acrylic polymer moulding at a spray pressure of 180 bar using an Applikator IP 8000 model high pressure airless sprayer together with Cadox 40 E in a ratio by volume of 100:2 to 100:5. The application rate is approx. 4–7 kg/m². No manual secondary finishing is required. A backing layer of a thickness of approx. 3 mm is obtained.

At a curing agent addition of 100:2, the curing time is approx. 15–25 min.

At a curing agent addition of 100:4, the curing time is approx. 5–15 min.

COMPARATIVE EXAMPLE 4 (VB4)

Two-layer reinforcement, first reinforcing layer with hollow microspheres, second reinforcing layer without hollow microspheres, thickness of each reinforcing layer approx. 1.5 mm, thickness of entire reinforcement approx. 3 mm, neither binder with urethane (meth)acrylate;

(i) first reverse reinforcing layer:

40.00 parts by weight of a binder consisting of 30.00% of polymethyl methacrylate
42.00% of methyl methacrylate
25.70% of 2-ethylhexyl acrylate
0.50% of triethylene glycol dimethacrylate
0.80% of diisopropylolparatoluidine
0.70% of dimethylparatoluidine
0.30% of paraffins (melting point <56° C.)

are stirred for 4 hours with 54.00 parts by weight of mica (<100 μm)
6.00 parts by weight of gas filled hollow acrylonitrile copolymer microspheres coated with calcium carbonate and having an average particle size of approx. 95 μm of the type ® Dualite 6032 from Pierce & Stevens Corporation and
0.10 parts by weight of thixotroping agent (Byk 410).

The mixture has a viscosity of 6000–10000 mPas.

This mixture is applied onto the shaped acrylic polymer moulding at a spray pressure of 180 bar using an Applikator IP 8000 model high pressure airless sprayer together with Cadox 40 E in a ratio by volume of 100:2 to 100:5. No manual secondary finishing is required. The application rate is approx. 2–3.5 kg/m$_2$.

At a curing agent addition of 100:2, the curing time is approx. 15–40 min.

At a curing agent addition of 100:5, the curing time is approx. 5–20 min.

A second layer of the following mixture is then applied by spraying:

(ii) second, outer reinforcing layer:

40.00 parts by weight of a binder consisting of 18.00% of polymethyl methacrylate
75.00% of methyl methacrylate
5.00% of triethylene glycol dimethacrylate
0.50% of paraffins (melting point <56° C.)
0.50% of dimethylparatoluidine
0.50% of diisopropylolparatoluidine
0.50% of additives, stabilisers are stirred for 4 hours with.

60.00 parts by weight of mica (<100 μm)
0.10 parts by weight of thixotroping agent (Byk 410).

The mixture has a viscosity of 11000–13000 mPas.
Curing agent addition is 100:2 to 100:5.
Spraying pressure is 180 bar.
The application rate is 2–3.5 kg/m$^2$.

The curing time is 15–30 minutes at a curing agent addition of 100:2.

At a curing agent addition of 100:5, the curing time is approx. 5–15 min.

EXAMPLE 5 (B5)

5.1. Production of polyfunctional (tetrafunctional) urethane (meth)acrylates in a single stage synthesis Production of polyfunctional urethane (meth)acrylate in a single stage synthesis 0.2 mol of ®Voranol CP 6055 (DOW), 0.4 mol of hydroxyethyl methacrylate (HEMA), 500 ppm of 2,6-di-tert.-butyl-4-methylphenol, relative to the predicted quantity of finished product, 0.46 mol of IPDI and $2*10^{-3}$ mol of dibutyltin dilaurate (DBTL) are initially introduced into a round-bottomed flask equipped with a reflux condenser, thermometer, stirrer and dropping funnel and stirred for 1 hour at room temperature. The temperature of the mixture is then raised continuously within 1 hour to 80° C. The temperature is then maintained at 80° C. for approx. 5 hours until the content of isocyanate groups has fallen to below 0.1%, wherein a nitrogen/oxygen mixture containing approx. 7 vol. % of oxygen is provided above the mixture. Residual quantities of isocyanate groups are reacted with a stoichiometric quantity of HEMA, in the event that the isocyanate content does not fall below 0.1% despite extending the post-reaction time. 500 ppm of 2-tert.-butyl-4,6-dimethylphenol, relative to the total mass of the finished product, are then added to the mixture.

A mixture of urethane methacrylates is obtained from this reaction which may be used without further working up.

5.2. Production of backed sanitaryware according to the invention:

One-layer reinforcement with addition of urethane methacrylate from step 5.1 to the binder, without hollow microsphere fillers, thickness of backing layer approx. 3 mm;

40.00 parts by weight of a binder consisting of 18.00% of polymethyl methacrylate
66.00% of methyl methacrylate
5.00% of triethylene glycol dimethacrylate
9.00% of urethane methacrylate according to 5.1
0.50% of paraffins (melting point <56° C.)
0.50% of dimethylparatoluidine
0.50% of diisopropoxyparatoluidine
0.50% of additives, stabilisers are stirred for 4 hours with 60.00 parts by weight of mica (<100 μm)
and
0.10 parts by weight of thixotroping agent (Byk 410).

The mixture has a viscosity of 11000–13000 mpas.

This mixture is applied onto the shaped acrylic polymer moulding at a spray pressure of 180 bar using an Applikator IP 8000 model high pressure airless sprayer together with Cadox 40 E in a ratio by volume of 100:2 to 100:5. The application rate is approx. 4–7 kg/m$^2$. No manual secondary finishing is required. A backing layer of a thickness of approx. 3 mm is obtained.

At a curing agent addition of 100:2, the curing time is approx. 15–25 min.

At a curing agent addition of 100:4, the curing time is approx. 5–15 min.

EXAMPLE 6 (B6)

6.1. Production of polyfunctional (tetrafunctional) urethane (meth)acrylates in a single stage synthesis A polyfunctional urethane (meth)acrylate was produced as in Example 5.1.

6.2. Production of backed sanitaryware according to the invention:

One-layer reinforcement with addition of urethane methacrylate from step 5.1 to the binder, and with hollow microsphere filler, thickness of backing layer approx. 3 mm;

40.00 parts by weight of a binder consisting of 18.00% of polymethyl methacrylate
66.00% of methyl methacrylate
5.00% of triethylene glycol dimethacrylate
9.00% of urethane methacrylate according to 5.1
0.50% of paraffins (melting point <56° C.)
0.50% of dimethylparatoluidine
0.50% of diisopropoxyparatoluidine
0.50% of additives, stabilisers are stirred for 4 hours with 54.00 parts by weight of mica (<100 μm)
6.00 parts by weight of gas filled hollow acrylonitrile copolymer microspheres coated with calcium carbonate and having an average particle size of approx. 95 μm of the type ® Dualite 6032 from Pierce & Stevens Corporation and
0.10 parts by weight of thixotroping agent (Byk 410).

The mixture has a viscosity of 11000–13000 mPas.

This mixture is applied onto the shaped acrylic polymer moulding at a spray pressure of 180 bar using an Applikator IP 8000 model high pressure airless sprayer together with Cadox 40 E in a ratio by volume of 100:2 to 100:5. The application rate is approx. 4–7 kg/m². No manual secondary finishing is required. A backing layer of a thickness of approx. 3 mm is obtained.

At a curing agent addition of 100:2, the curing time is approx. 15–25 min.

At a curing agent addition of 100:4, the curing time is approx. 5–15 min.

After curing, the baths obtained in Examples 5 and 6 and Comparative Examples 1 to 4 are subjected to testing to DIN EN 198, DIN ISO 4624, DIN ISO 178 and DIN ISO 179. The methods used were in each case those valid in 1996.

For testing in the alternating hot water test to DIN EN 198, a bath is filled alternately with water at 75° C. and then at 12° C. DIN EN 198 requires that the bath should withstand 100 such cycles without damage. Passing the test entails that the condition of the baths should be such that there is no detachment of the reinforcement and no cracks in the acrylic polymer.

Behaviour on exposure to impact in accordance with the falling ball test to DIN EN 198 is deemed acceptable if the surface and the underside of a bath are undamaged after a 200 g steel ball has been dropped from a height of 1 m onto the bottom of the bath.

These and further results may be found in Table 1.

TABLE 1

| Example/ Comparative Example | Impact strength DIN ISO 179 kJ/m² | Tensile bond strength DIN ISO 4624 N/mm² | Flexural strength DIN ISO 178 MPa | Alternating hot water test DIN EN 198 No. of cycles | Falling ball test DIN EN 198 Damage |
|---|---|---|---|---|---|
| VB1 | 8 | 0.3 | 15 | 150 (defective) | none |
| VB2 | 10 | — | — | 200 (defective) | none |
| VB3 | 25 | 0.5 | 25 | 350 (intact) | none |
| VB4 | 15 | 0.5 | 20 | 210 (defective) | none |
| B5 | 17 | 0.4 | 30 | 350 (intact) | none |
| B6 | 25 | 0.6 | 30 | 350 (intact) | none |

What is claimed is:

1. Backed sanitaryware comprising an acrylic polymer moulding, a reverse of which is reinforced with a polymer material containing neither glass fibre nor asbestos, wherein said polymer material is firmly bonded to the acrylic polymer moulding, wherein the polymer material is produced by curing a polymerizable, cold-curing reactive (meth)acrylate system applied onto the reverse of the acrylic polymer moulding, wherein the polymerizable, cold-curing reactive (meth) acrylate system comprises

| (A) | a) | (meth)acrylate | 30–100 wt. % |
|---|---|---|---|
| | a1) | methyl (methacrylate) | 0–99.8 wt. % |
| | a2) | $C_2$—$C_4$ (meth)acrylate | 0–99.8 wt. % |
| | a3) | $\geq C_5$ (meth)acrylate | 0–50 wt. % |
| | a4) | polyfunctional (meth)acrylates | 0–50 wt. % |
| | a5) | urethane (meth)acrylates | 0.2–50 wt. % |
| | b) | comonomers | 0–70 wt. % |

-continued

| | | |
|---|---|---|
| b1) | vinyl aromatics | 0–35 wt. % |
| b2) | vinyl esters | 0–35 wt. % | wherein components a1) to b2) are selected such that, together, components a1) to b2) amount to 100 wt. %, (B) per 1 part by weight of A), 0.05–5 parts by weight of a (pre)polymer soluble or swellable in A), wherein (B) comprises PMMA lacquer beads obtained by suspension polymerization, an emulsion polymer, ground material from a recycling process or a mixture thereof, wherein the PMMA lacquer beads have an average particle diameter of up to 0.8 mm;

(C) a redox system containing an accelerator and a peroxide catalyst or initiator in a quantity sufficient for cold-curing component A), which redox system is to be kept entirely or partially segregated until the constituents of the polymerisable, cold-curing reactive (meth) acrylate system to be polymerised are polymerised (D) conventional additives; and (E) 0–75 wt. % of fillers relative to the sum of A)–E).

2. Backed sanitaryware comprising an acrylic polymer moulding, a reverse of which is reinforced with a polymer material containing neither glass fibre nor asbestos, wherein said polymer material is firmly bonded to the acrylic polymer moulding, wherein the polymer material is produced by curing a polymerizable, cold-curing reactive (meth)acrylate system applied onto the reverse of the acrylic polymer moulding, wherein the polymerizable, cold-curing reactive (meth) acrylate system comprises

| (A) | a) | (meth)acrylate | 30–100 wt. % |
|---|---|---|---|
| | a1) | methyl (methacrylate) | 0–99.8 wt. % |
| | a2) | C$_2$–C$_4$ (meth)acrylate | 0–99.8 wt. % |
| | a3) | ≧C$_5$ (meth)acrylate | 0–50 wt. % |
| | a4) | polyfunctional (meth)acrylates | 0–50 wt. % |
| | a5) | urethane (meth)acrylates | 0.2–50 wt. % |
| | b) | comonomers | 0–70 wt. % |
| | b1) | vinyl aromatics | 0–35 wt. % |
| | b2) | vinyl esters | 0–35 wt. % | wherein components a1) to b2) are selected such that, together, components a1) to b2) amount to 100 wt. %, (B) per 1 part by weight of A), 0.05–5 parts by weight of a (pre)polymer soluble or swellable in A)

(C) a redox system containing an accelerator and a peroxide catalyst or initiator in a quantity sufficient for cold-curing component A), which redox system is to be kept entirely or partially segregated until the constituents of the polymerisable, cold-curing reactive (meth) acrylate system to be polymerised are polymerised (D) conventional additives (E) 1–75 wt. % of fillers relative to the sum of A)–E), wherein the fillers comprise gas-filled, hollow expanded microspheres of plastic, and wherein the hollow microspheres are coated with calcium carbonate.

3. Backed sanitaryware comprising an acrylic polymer moulding, a reverse of which is reinforced with a polymer material containing neither glass fibre nor asbestos, wherein said polymer material is firmly bonded to the acrylic polymer moulding, wherein the polymer material is produced by curing a polymerizable, cold-curing reactive (meth)acrylate system applied onto the reverse of the acrylic polymer moulding, wherein the polymerizable, cold-curing reactive (meth) acrylate system comprises

| (A) | a) | (meth)acrylate | 30–100 wt. % |
|---|---|---|---|
| | a1) | methyl (methacrylate) | 0–99.8 wt. % |
| | a2) | C$_2$–C$_4$ (meth)acrylate | 0–99.8 wt. % |
| | a3) | ≧C$_5$ (meth)acrylate | 0–50 wt. % |
| | a4) | polyfunctional (meth)acrylates | 0–50 wt. % |
| | a5) | urethane (meth)acrylates | 0.2–50 wt. % |
| | b) | comonomers | 0–70 wt. % |
| | b1) | vinyl aromatics | 0–35 wt. % |
| | b2) | vinyl esters | 0–35 wt. % | wherein components a1) to b2) are selected such that, together, components a1) to b2) amount to 100 wt. %, (B) per 1 part by weight of A), 0.05–5 parts by weight of a (pre)polymer soluble or swellable in A)

(C) a redox system containing an accelerator and a peroxide catalyst or initiator in a quantity sufficient for cold-curing component A), which redox system is to be kept entirely or partially segregated until the constituents of the polymerisable, cold-curing reactive (meth) acrylate system to be polymerised are polymerised (D) conventional additives (E) 1–75 wt. % of fillers relative to the sum of A)–E), wherein the fillers comprise gas-filled, hollow expanded microspheres of plastic, wherein B) comprises PMMA lacquer beads obtained by suspension polymerisation, an emulsion polymer and/or ground material from a recycling process having an average particle diameter of up to 0.8 mm.

4. Sanitaryware according to claim 1, wherein the (meth) acrylate system A) to E) used to the form the reinforcing layer of the sanitaryware contains at least one urethane (meth)acrylate a5) which comprises at least three reactive, terminal, ethylenically unsaturated functionalities.

5. Sanitaryware according to claim 1, wherein the content of component a5) is in the range from 3 to 25 wt. %, relative to the sum of components a) and b) to 100 wt. %.

6. Sanitaryware according to claim 5, wherein the content of component a5) is in the range from 5 to 20 wt. %, relative to the sum of components a) and b) to 100 wt. %.

7. Sanitaryware according to claim 1, wherein the urethane (meth)acrylate a5) used is obtained by reacting either I)

i) hydroxyalkyl (meth)acrylic acid esters with ii) polyisocyanates and iii) polyoxyalkylenes having at least three hydroxyl functionalities, wherein the proportion of polyethylene oxide is less than 50 wt. %, relative to the total quantity of polyoxyalkylene, or II)

i') hydroxyalkyl (meth)acrylic acid esters with ii') mixtures of polyisocyanates, at least one of which polyisocyanates has three or more isocyanate groups, and iii') polyoxyalkylenes having at least two hydroxyl functionalities, wherein the proportion of polyethylene oxide is less than 50 wt.%, relative to the total quantity of polyoxyalkylene.

8. Sanitaryware according to claim 7, wherein the urethane (meth)acrylates a5) are obtained by reacting hydroxyethyl methacrylate, hydroxyethyl acrylate, hydroxypropyl methacrylate, hydroxypropyl acrylate and/or mixtures of two or more thereof as the hydroxyalkyl (meth)acrylic acid esters.

9. Sanitaryware according to claim 7, wherein the urethane (meth)acrylates a5) are obtained by reacting 2,4-toluene diisocyanate, 2,6-toluene diisocyanate, 4,4'-diphenylmethane diisocyanate (MDI), 4,4'-dicyclohexyl diisocyanate, meta- and para-tetramethylxylylene diisocyanate, 3-isocyanatomethyl-3,5,5-trimethylcyclohexyl isocyanate (isophorone diisocyanate), hexamethylene diisocyanate, 1,5-naphthylene diisocyanate, dianisidine diisocyanate, di-(2-isocyanatoethyl)bicyclo[2.2.1]hept-5-ene 2,3-dicarboxylate, 2,2,4- and 2,4,4-trimethylenehexamethylene diisocyanate, triphenylmethane 4,4',4"-triisocyanate, tris-(4-isocyanatophenyl) thiophosphate and mixtures thereof as the polyisocyanate.

10. Sanitaryware according to claim 1, wherein the urethane (meth)acrylates are obtained by reacting polyoxypropylene and/or polytetramethylene oxides, which each have at least three reactive, terminal hydroxyl functionalities, as the polyoxyalkylene.

11. Sanitaryware according to claim 1, wherein the urethane (meth)acrylates have three or four reactive, terminal, ethylenically unsaturated functionalities.

12. Sanitaryware according to claim 1, wherein the urethane (meth)acrylates are obtained by reacting polyoxyalkylenes which have a weight average molecular weight in the range from 2000 to 20000.

13. Sanitaryware according to claim 1, wherein the fillers E) are present in the (meth)acrylate system in a quantity of 40–65 wt. %, relative to the sum of A)–E).

14. Sanitaryware according to claim 13, wherein the fillers E) are present in the (meth)acrylate system in a quantity of 50–60 wt. %, relative to the sum of A)–E).

15. Sanitaryware according to claim 1, wherein the (meth) acrylate system comprises components B):A) in a ratio by weight in the range from 0.1:1 to 2:1.

16. Sanitaryware according to claim 15, wherein the ratio by weight of B):A) is in the range from 0.2:1 to 1:1.

17. Sanitaryware according to claim 1, wherein the reinforcing material consists of a first and a second layer, wherein each of the layers is obtained by curing the polymerisable, cold-curing, reactive, (meth)acrylate system which is applied onto the reverse of the acrylic polymer moulding, and the (meth)acrylate systems used to produce each layer differ from one another at least with regard to one component.

18. Sanitaryware according to claim 17, wherein the (pre)polymer of the first reinforcing layer has a comonomer content of between 30 and 80 wt. %, while that of the second reinforcing layer is between 0 and <30 wt. %.

19. Sanitaryware according to claim 18, wherein the comonomer is a member selected from the group consisting of methyl acrylate, ethyl acrylate, butyl acrylate, 2-ethylhexyl acrylate, ethyl methacrylate, n-butyl methacrylate, i-butyl methacrylate, 2-ethylhexyl methacrylate, propyl acrylate, propyl methacrylate, methacrylic acid, triethylene glycol ethyl ether methacrylate, and hydroxypropyl methacrylate.

20. Sanitaryware according to claim 17, wherein in the presence of two reinforcing layers, the first layer has a thickness of 0.5–2.5 mm and the second layer a thickness in the range from 2.5–<5.5 mm.

21. Sanitaryware according to claim 1, wherein the weight ratio of components (B) and (A) is in the range of from 0.1:1 to 2:1.

22. Sanitaryware according to claim 2, wherein the (meth) acrylate system A) to E) used to the form the reinforcing layer of the sanitaryware contains at least one urethane (meth)acrylate a5) which comprises at least three reactive, terminal, ethylenically unsaturated functionalities.

23. Sanitaryware according to claim 2, wherein the content of component a5) is in the range from 3 to 25 wt. %, relative to the sum of components a) and b) to 100 wt. %.

24. Sanitaryware according to claim 23, wherein the content of component a5) is in the range from 5 to 20 wt. %, relative to the sum of components a) and b) to 100 wt. %.

25. Sanitaryware according to claim 2, wherein the urethane (meth)acrylate a5) used is obtained by reacting either
I)
  i) hydroxyalkyl (meth)acrylic acid esters with
  ii) polyisocyanates and
  iii) polyoxyalkylenes having at least three hydroxyl functionalities, wherein the proportion of polyethylene oxide is less than 50 wt.%, relative to the total quantity of polyoxyalkylene, or II)
  i') hydroxyalkyl (meth)acrylic acid esters with
  ii') mixtures of polyisocyanates, at least one of which polyisocyanates has three or more isocyanate groups, and
  iii') polyoxyalkylenes having at least two hydroxyl functionalities, wherein the proportion of polyethylene oxide is less than 50 wt. %, relative to the total quantity of polyoxyalkylene.

26. Sanitaryware according to claim 25, wherein the urethane (meth)acrylates a5) are obtained by reacting hydroxyethyl methacrylate, hydroxyethyl acrylate, hydroxypropyl methacrylate, hydroxypropyl acrylate and/or mixtures of two or more thereof as the hydroxyalkyl (meth) acrylic acid esters.

27. Sanitaryware according to claim 25, wherein the urethane (meth)acrylates a5) are obtained by reacting 2,4-toluene diisocyanate, 2,6-toluene diisocyanate, 4,4'-diphenylmethane diisocyanate (MDI), 4,4'-dicyclohexyl diisocyanate, meta- and para-tetramethylxylylene diisocyanate, 3-isocyanatomethyl-3,5,5-trimethylcyclohexyl isocyanate (isophorone diisocyanate), hexamethylene diisocyanate, 1,5-naphthylene diisocyanate, dianisidine diisocyanate, di-(2-isocyanatoethyl)bicyclo[2.2.1]hept-5-ene 2,3-dicarboxylate, 2,2,4- and 2,4,4-trimethylenehexamethylene diisocyanate, triphenylmethane 4,4',4"-triisocyanate, tris-(4-isocyanatophenyl) thiophosphate and mixtures thereof as the polyisocyanate.

28. Sanitaryware according to claim 2, wherein the urethane (meth)acrylates are obtained by reacting polyoxypropylene and/or polytetramethylene oxides, which each have at least three reactive, terminal hydroxyl functionalities, as the polyoxyalkylene.

29. Sanitaryware according to claim 2, wherein the urethane (meth)acrylates have three or four reactive, terminal, ethylenically unsaturated functionalities.

30. Sanitaryware according to claim 2, wherein the urethane (meth)acrylates are obtained by reacting polyoxyalkylenes which have a weight average molecular weight in the range from 2000 to 20000.

31. Sanitaryware according to claim 2, wherein the fillers E) are present in the (meth)acrylate system in a quantity of 40–65 wt. %, relative to the sum of A)–E).

32. Sanitaryware according to claim 31, wherein the fillers E) are present in the (meth)acrylate system in a quantity of 50–60 wt. %, relative to the sum of A)–E).

33. Sanitaryware according to claim 2, wherein the (meth) acrylate system comprises components B): A) in a ratio by weight in the range from 0.1:1 to 2:1.

34. Sanitaryware according to claim 33, wherein the ratio by weight of B):A) is in the range from 0.2:1 to 1:1.

35. Sanitaryware according to claim 2, wherein the reinforcing material consists of a first and a second layer, wherein each of the layers is obtained by curing the polymerisable, cold-curing, reactive, (meth)acrylate system which is applied onto the reverse of the acrylic polymer moulding, and the (meth)acrylate systems used to produce each layer differ from one another at least with regard to one component.

36. Sanitaryware according to claim 35, wherein the (pre)polymer of the first reinforcing layer has a comonomer content of between 30 and 80 wt. %, while that of the second reinforcing layer is between 0 and <30 wt. %.

37. Sanitaryware according to claim 36, wherein the comonomer is a member selected from the group consisting of methyl acrylate, ethyl acrylate, butyl acrylate, 2-ethylhexyl acrylate, ethyl methacrylate, n-butyl methacrylate, i-butyl methacrylate, 2-ethylhexyl methacrylate, propyl acrylate, propyl methacrylate, methacrylic acid, triethylene glycol ethyl ether methacrylate, and hydroxypropyl methacrylate.

38. Sanitaryware according to claim 35, wherein in the presence of two reinforcing layers, the first layer has a thickness of 0.5–2.5 mm and the second layer a thickness in the range from 2.5–<5.5 mm.

39. Sanitaryware according to claim 2, wherein the weight ratio of components (B) and (A) is in the range of from 0.1:1 to 2:1.

40. Sanitaryware according to claim 3, wherein the (meth)acrylate system A) to E) used to the form the reinforcing layer of the sanitaryware contains at least one urethane (meth)acrylate a5) which comprises at least three reactive, terminal, ethylenically unsaturated functionalities.

41. Sanitaryware according to claim 3, wherein the content of component a5) is in the range from 3 to 25 wt. %, relative to the sum of components a) and b) to 100 wt. %.

42. Sanitaryware according to claim 41, wherein the content of component a5) is in the range from 5 to 20 wt. %, relative to the sum of components a) and b) to 100 wt. %.

43. Sanitaryware according to claim 3, wherein the urethane (meth)acrylate a5) used is obtained by reacting either I)
  i) hydroxyalkyl (meth)acrylic acid esters with
  ii) polyisocyanates and
  iii) polyoxyalkylenes having at least three hydroxyl functionalities, wherein the proportion of polyethylene oxide is less than 50 wt. %, relative to the total quantity of polyoxyalkylene, or II)
  i') hydroxyalkyl (meth)acrylic acid esters with
  ii') mixtures of polyisocyanates, at least one of which polyisocyanates has three or more isocyanate groups, and
  iii') polyoxyalkylenes having at least two hydroxyl functionalities, wherein the proportion of polyethylene oxide is less than 50 wt. %, relative to the total quantity of polyoxyalkylene.

44. Sanitaryware according to claim 43, wherein the urethane (meth)acrylates a5) are obtained by reacting hydroxyethyl methacrylate, hydroxyethyl acrylate, hydroxypropyl methacrylate, hydroxypropyl acrylate and/or mixtures of two or more thereof as the hydroxyalkyl (meth)acrylic acid esters.

45. Sanitaryware according to claim 43, wherein the urethane (meth)acrylates a5) are obtained by reacting 2,4-toluene diisocyanate, 2,6-toluene diisocyanate, 4,4'-diphenylmethane diisocyanate (MDI), 4,4'- dicyclohexyl diisocyanate, meta- and para-tetramethylxylylene diisocyanate, 3-isocyanatomethyl-3,5,5- trimethylcyclohexyl isocyanate (isophorone diisocyanate), hexamethylene diisocyanate, 1,5-naphthylene diisocyanate, dianisidine diisocyanate, di-(2- isocyanatoethyl)bicyclo[2.2.1 ]hept-5-ene 2,3-dicarboxylate, 2,2,4- and 2,4,4-trimethylenehexamethylene diisocyanate, triphenylmethane 4,4',4"-triisocyanate, tris-(4- isocyanatophenyl) thiophosphate and mixtures thereof as the polyisocyanate.

46. Sanitaryware according to claim 3, wherein the urethane (meth)acrylates are obtained by reacting polyoxypropylene and/or polytetramethylene oxides, which each have at least three reactive, terminal hydroxyl functionalities, as the polyoxyalkylene.

47. Sanitaryware according to claim 3, wherein the urethane (meth)acrylates have three or four reactive, terminal, ethylenically unsaturated functionalities.

48. Sanitaryware according to claim 3, wherein the urethane (meth)acrylates are obtained by reacting polyoxyalkylenes which have a weight average molecular weight in the range from 2000 to 20000.

49. Sanitaryware according to claim 3, wherein the fillers E) are present in the (meth)acrylate system in a quantity of 40–65 wt. %, relative to the sum of A)–E).

50. Sanitaryware according to claim 49, wherein the fillers E) are present in the (meth)acrylate system in a quantity of 50–60 wt. %, relative to the sum of A)–E).

51. Sanitaryware according to claim 3, wherein the (meth)acrylate system comprises components B):A) in a ratio by weight in the range from 0.1:1 to 2:1.

52. Sanitaryware according to claim 51, wherein the ratio by weight of B):A) is in the range from 0.2:1 to 1:1.

53. Sanitaryware according to claim 3, wherein the reinforcing material consists of a first and a second layer, wherein each of the layers is obtained by curing the polymerisable, cold-curing, reactive, (meth)acrylate system which is applied onto the reverse of the acrylic polymer moulding, and the (meth)acrylate systems used to produce each layer differ from one another at least with regard to one component.

54. Sanitaryware according to claim 53, wherein the (pre)polymer of the first reinforcing layer has a comonomer content of between 30 and 80 wt. %, while that of the second reinforcing layer is between 0 and <30 wt. %.

55. Sanitaryware according to claim 54, wherein the comonomer is a member selected from the group consisting of methyl acrylate, ethyl acrylate, butyl acrylate, 2-ethylhexyl acrylate, ethyl methacrylate, n-butyl methacrylate, i-butyl methacrylate, 2-ethylhexyl methacrylate, propyl acrylate, propyl methacrylate, methacrylic acid, triethylene glycol ethyl ether methacrylate, and hydroxypropyl methacrylate.

56. Sanitaryware according to claim 53, wherein in the presence of two reinforcing layers, the first layer has a thickness of 0.5–2.5 mm and the second layer a thickness in the range from 2.5–<5.5 mm.

57. Sanitaryware according to claim 3, wherein the weight ratio of components (B) and (A) is in the range of from 0.1:1 to 2:1.

* * * * *